United States Patent
Wang et al.

(10) Patent No.: US 10,742,382 B2
(45) Date of Patent: Aug. 11, 2020

(54) UPLINK MULTI-BITS ACKNOWLEDGEMENT FOR SELF CONTAINED TRANSMISSIONS

(71) Applicant: QUALCOMM Incorporated, San Diego, CA (US)

(72) Inventors: Renqiu Wang, San Diego, CA (US); Yi Huang, San Diego, CA (US); Krishna Mukkavilli, San Diego, CA (US); Peter Ang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/446,350

(22) Filed: Jun. 19, 2019

(65) Prior Publication Data
US 2019/0305910 A1 Oct. 3, 2019

Related U.S. Application Data

(63) Continuation of application No. 15/906,638, filed on Feb. 27, 2018, now Pat. No. 10,367,624.
(Continued)

(51) Int. Cl.
| | |
|---|---|
| *H04K 1/10* | (2006.01) |
| *H04L 27/28* | (2006.01) |
| *H04L 5/00* | (2006.01) |
| *H04W 28/04* | (2009.01) |
| *H04L 1/18* | (2006.01) |

(52) U.S. Cl.
CPC .......... *H04L 5/0055* (2013.01); *H04L 1/1854* (2013.01); *H04L 1/1861* (2013.01);
(Continued)

(58) Field of Classification Search
CPC ... H04L 5/0055; H04L 1/1854; H04L 1/1861; H04L 1/1812; H04L 5/0007;
(Continued)

(56) References Cited

U.S. PATENT DOCUMENTS

| | | |
|---|---|---|
| 10,367,624 B2 | 7/2019 | Wang et al. |
| 2011/0110444 A1* | 5/2011 | Roh ...................... H04L 1/0003 375/260 |

(Continued)

OTHER PUBLICATIONS

CATT: "NR Scheduling and HARQ Operation", 3GPP Draft; R1-1700202, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-2017012016, Jan. 2017 (Jan. 16, 2017), 3 Pages, XP051207742, Retrieved from the Internet: URL: http://www.3gpp.org/ftp/Meetings_3GPP_SYNC/RAN1/Docs/ [retrieved on Jan. 16, 2017].
(Continued)

*Primary Examiner* — Phuong Phu
(74) *Attorney, Agent, or Firm* — Arent Fox LLP

(57) ABSTRACT

Aspects described herein relate to communicating feedback in wireless communications. A user equipment (UE) can receive, in a downlink portion of a slot, data communications from a base station, where the data communications comprise multiple code blocks received in one or more downlink symbols. The UE can generate one or more feedback bits to provide feedback for the multiple code blocks. The UE can transmit, to the base station and in an uplink portion of the slot, an indication of the one or more feedback bits.

22 Claims, 12 Drawing Sheets

Related U.S. Application Data

(60) Provisional application No. 62/465,677, filed on Mar. 1, 2017.

(52) U.S. Cl.
CPC ........... *H04W 28/04* (2013.01); *H04L 1/1812* (2013.01); *H04L 1/1896* (2013.01); *H04L 5/0007* (2013.01); *H04L 5/0051* (2013.01)

(58) Field of Classification Search
CPC ... H04L 1/1896; H04L 5/0051; H04L 5/0057; H04L 1/0003; H04W 28/04; H04W 72/048; H04B 7/0413
USPC .......................... 375/260, 346, 219, 220, 222
See application file for complete search history.

(56) References Cited

U.S. PATENT DOCUMENTS

| | | | | |
|---|---|---|---|---|
| 2012/0327821 | A1* | 12/2012 | Lin ..................... | H04W 72/048 370/280 |
| 2017/0070277 | A1* | 3/2017 | Si .......................... | H04L 5/0057 |

OTHER PUBLICATIONS

International Search Report and Written Opinion—PCT/US2018/020226—ISA/EPO—dated Jul. 20, 2018.

NTT Docomo, et al., "Summary of [87-36]: Mini-slot designs for NR", 3GPP Draft; R1-1700617, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 17, 2017 (Jan. 17, 2017), XP051222222, Retrieved from the Internet: URL: http://www.3gpp.org/ftp/tsg_ran/WG1_RL1/TSGR1_AH/NR_AH_1701/Docs/ [retrieved on Jan. 17, 2017].

Partial International Search Report—PCT/US2018/020226—ISA/EPO—dated May 24, 2018.

Qualcomm Incorporated: "URLLC/eMBB Downlink Dynamic Multiplexing Schemes", 3GPP Draft; R1-1700827, 3rd Generation Partnership Project (3GPP), Mobile Competence Centre; 650, Route Des Lucioles; F-06921 Sophia-Antipolis Cedex; France vol. RAN WG1, No. Spokane, Wa; Jan. 16, 2017-Jan. 20, 2017, Jan. 16, 2017 (Jan. 16, 2017), 7 Pages, XP051208346, Retrieved from the Internet: URL: http://www.3gpp.org/ftp/Meetings_3GPP_SYNC/RAN1/Docs/ [retrieved on Jan. 16, 2017].

* cited by examiner

UPLINK MULTI-BITS ACKNOWLEDGEMENT FOR SELF CONTAINED TRANSMISSIONS

CLAIM OF PRIORITY UNDER 35 U.S.C. § 119

This application is a continuation of U.S. patent application Ser. No. 15/906,638, entitled "UPLINK MULTI-BITS ACKNOWLEDGEMENT FOR SELF CONTAINED TRANSMISSIONS," filed on Feb. 27, 2018, which claims priority to U.S. Provisional Application No. 62/465,677, entitled "UPLINK MULTI-BITS ACKNOWLEDGEMENT FOR SELF CONTAINED TRANSMISSIONS" filed Mar. 1, 2017, which are assigned to the assignee hereof and hereby expressly incorporated by reference herein for all purposes.

BACKGROUND

Aspects of the present disclosure relate generally to wireless communication networks, and more particularly, to providing feedback in wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, transmitting of acknowledgements (ACKs)/negative acknowledgements or other feedback occurs by transmitting a single ACK/NACK used for all physical downlink shared channel (PDSCH) symbols/code blocks. This may result in using additional resources to retransmit some PDSCH symbols/code blocks that may have actually been received, but for which a NACK was reported in communicating the single ACK/NACK for the multiple PDSCH symbols/code blocks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating feedback in wireless communications is provided. The method includes receiving, at a user equipment (UE) and in a downlink portion of a slot, data communications from a base station, wherein the data communications comprise multiple code blocks received in one or more downlink symbols, generating, by the UE, one or more feedback bits to provide feedback for the multiple code blocks, and transmitting, from the UE to the base station and in an uplink portion of the slot, an indication of the one or more feedback bits.

In another example, an apparatus for wireless communication is provided. The apparatus includes a transceiver, a memory configured to store instructions, and one or more processors communicatively coupled with the transceiver and the memory. The one or more processors are configured to receive, in a downlink portion of a slot, data communications from a base station, wherein the data communications comprise multiple code blocks received in one or more downlink symbols, generate one or more feedback bits to provide feedback for the multiple code blocks, and transmit, to the base station and in an uplink portion of the slot, an indication of the one or more feedback bits.

In another example, a method for scheduling resources for communicating in a wireless network is provided. The method includes receiving, at a base station and from a UE, an indication of multiple feedback bits corresponding to feedback for multiple code blocks transmitted to the UE in a first slot, decoding the indication to obtain the multiple feedback bits, selecting one or more downlink symbols in a next slot for scheduling subsequent downlink communications for the UE based on whether the indication of the multiple feedback is received in a last uplink short burst symbol of the first slot, and scheduling, for the UE, resources for receiving the subsequent downlink communications in the one or more downlink symbols in the next slot.

In a further example, an apparatus for wireless communication is provided that includes a transceiver, a memory configured to store instructions, and one or more processors communicatively coupled with the transceiver and the memory. The one or more processors are configured to receive, from a UE, an indication of multiple feedback bits corresponding to feedback for multiple code blocks transmitted to the UE in a first slot, decode the indication to obtain the multiple feedback bits, select one or more downlink symbols in a next slot for scheduling subsequent downlink communications for the UE based on whether the indication of the multiple feedback is received in a last uplink short burst symbol of the first slot, and schedule, for the UE, resources for receiving the subsequent downlink communications in the one or more downlink symbols in the next slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
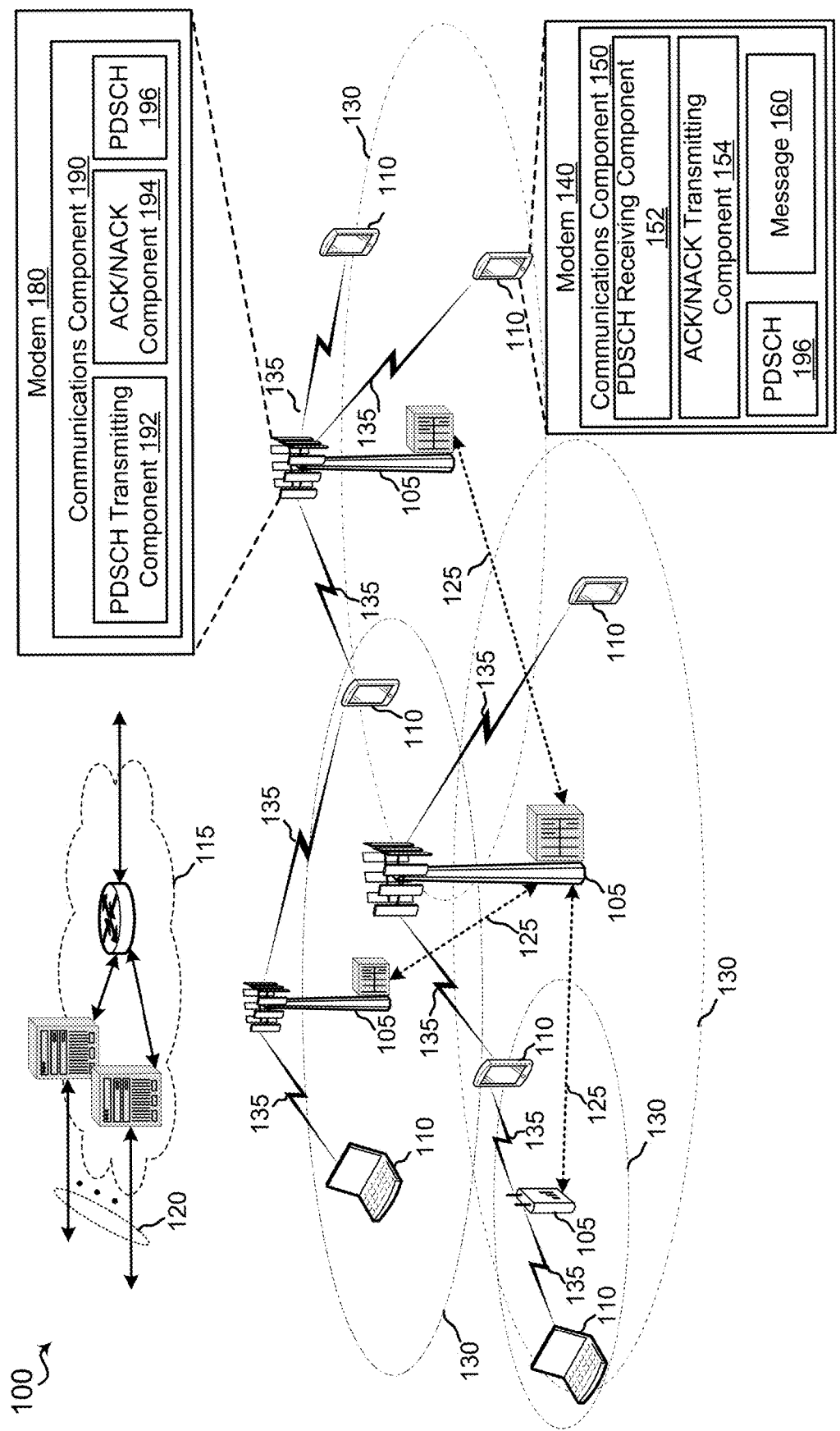
FIG. 1 is a schematic diagram of a wireless communication network including at least one user equipment (UE) having a communications component configured according to this disclosure to acknowledge messages in wireless communication, and at least one base station having a corresponding communication component configured according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to communicating feedback in wireless communications. For example, a UE receiving a physical downlink shared channel (PDSCH) from a base station can transmit feedback in response to receiving the PDSCH. The PDSCH can include multiple code blocks encoded over one or more symbols in a slot. Further, the feedback can include one or more bits to indicate feedback for the multiple code blocks, where the feedback relates to whether decoding of a given code block is successful. Due to scheduling configurations of the slots, a base station receiving the feedback may not have enough time to decode the feedback and determine scheduling for the UE in some symbols of a next slot. In this regard, the UE can determine types or encodings of feedback for transmitting to the base station based on a symbol used to transmit the feedback and/or the base station may delay downlink communication resource scheduling for the UE in the next slot.

In one example, the UE may transmit feedback over multiple symbols in an uplink portion of the slot, in which case one or more symbols may indicate a different type or encoding of feedback than one or more other symbols. For example, a last symbol in the slot may use a different type or encoding of feedback due to having a shorter turnaround time for subsequently scheduling downlink communications in a next slot based on the feedback. For example, the indication may be of a first type (e.g., a single bit used to provide feedback for the multiple code blocks (e.g., as a group or bundle)), a second type (e.g., an encoded indication of multiple bits), etc. In an example, whether the first type or second type (or other types) are used can be based on determining a symbol used to communicate the feedback in the slot. For example, for feedback indicated in a last symbol in an uplink portion of the slot, a first type of feedback (e.g., indicating a single bit can be used), and/or for feedback indicated in other symbols of the uplink portion of the slot (e.g., not the last symbol), a second type of feedback (e.g., indicating multiple bits) can be used, as there may be more time to decode the second type of feedback before scheduling subsequent downlink communication resources.

In another example, the base station may additionally or alternatively assist in processing feedback before scheduling subsequent downlink communication by using one or more symbols for other purposes to delay the downlink data portion of the next slot. For example, the base station can schedule control communications over multiple symbols, which can delay the data communications, and/or can schedule other channels in the downlink data portion of the next slot, such as a retransmission indicator channel, and/or the like. In other examples, the base station can schedule control and/or data communications for other UEs in symbols of the next slot that occur before scheduling of control and/or data communications for the UE from which the feedback is received to further delay the downlink data communications to the UE. In either case, the UE can transmit the feedback to the base station with enough time for the base station to schedule, based on the feedback, downlink data communications for the UE in the next slot.

Additional features of the present aspects are described in more detail below with respect to FIGS. 1-12.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856

(TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least user equipment (UE) 110 with a modem 140 having a communications component 150 that manages, or is otherwise used in conjunction with, a physical downlink shared channel (PDSCH) receiving component 152 for receiving downlink data communications (e.g., from a base station 105) in a PDSCH 196 transmitted by the base station 105, and/or an acknowledgement/negative acknowledgement (ACK/NACK) transmitting component 154 for generating and/or transmitting a message 160, which may include one or more feedback bits transmitted over one or more uplink symbols (e.g., as part of a physical uplink shared channel) to the base station 105, where the one or more feedback bits can relate to acknowledging (or not acknowledging) communications received in the PDSCH 196. The example wireless communication network 100 may further include a base station 105 (which may be an eNB) with a modem 180 having a corresponding communications component 190 that manages, or is otherwise used in conjunction with, a PDSCH transmitting component 192 for transmitting downlink data communications to one or more UEs 110 in a PDSCH 196, and/or an ACK/NACK component 194 for receiving feedback related to the communications received in the PDSCH 196.

In one implementation, base station 105 may transmit data over PDSCH 196 to UE 110. The data transmitted over PDSCH 196 may include one or more orthogonal frequency division multiplexing (OFDM) symbols and each OFDM symbol may further include one or more code blocks (CBs). For example, the CBs can correspond to blocks of frequency resources in a given symbol, where the blocks may include contiguous (or non-contiguous) frequency resource elements of a similar or same size. Each CB may be used to encode a PDSCH communication for receipt and decoding by the UE 110. The UE 110 may receive the data transmitted from the base station 105 over the PDSCH 196 and may send a message 160 to the base station 105. The message 160 may include one or more bits corresponding to symbols/code blocks that were successfully decoded at the UE 110.

According to the present disclosure, the UE 110 and/or communications component 150 may receive data over the PDSCH 196 from the base station 105. The PDSCH 196 may include multiple code blocks communicated over one or more symbols. In response to receiving data over the PDSCH 196, the UE 110 and/or communications component 150 may transmit the message 160. In one example, the message 160 may be transmitted such that the message 160 contains one or more feedback indications to indicate feedback regarding whether the code blocks are successfully received and/or decoded. For example, the feedback indications may include one or more hybrid automatic repeat/request (HARD) indications, such as an acknowledgement (ACK) or non-ACK (NACK), indicating whether one or more of the code blocks in the PDSCH 196 are successfully received and/or decoded. For example, the feedback indications may include indications of one or more types, which may be dependent on a symbol used to transmit the feedback indication(s), as described further herein. The one or more types may include feedback indications that are encoded and/or multiplexed for multiple code blocks using a repetition code, a Polar code, a Reed-Muller code, etc. In another example, the base station 105 can utilize communications component 190 to transmit downlink communications in one or more symbols to delay scheduling based on the feedback.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2A:
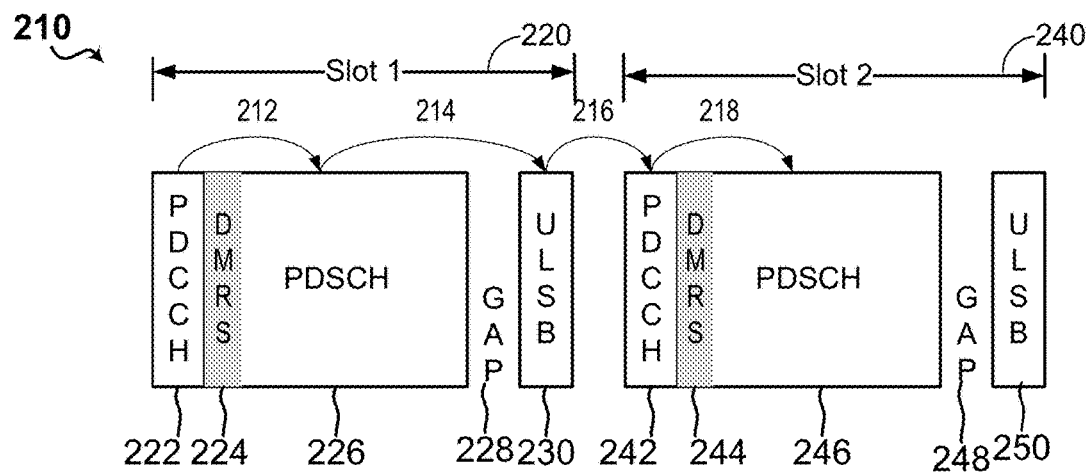
FIG. 2A illustrates an example of a single interlace self-contained transmission according to aspects of the present disclosure.

Referring to FIG. 2A, an example of a single interlace self-contained transmission 210 may comprise a slot (or frame) structure which may include downlink centric slots 220 and 240. Although the slots 220 and 240 in FIG. 2A are shown with downlink centric slots, slots 220 and 240 may be a combination of downlink centric and/or uplink centric slots. For example, a downlink centric slot may be defined as having more symbols assigned for downlink communications than an uplink centric slot, more symbols assigned for downlink communications than for uplink communications within the downlink centric slot, etc. Similarly, an uplink centric slot may be defined as having more symbols assigned for uplink communications than a downlink centric slot, more symbols assigned for uplink communications than for downlink communications within the uplink centric slot, etc.

The downlink centric slot 220 may include one or more symbols assigned for communicating a physical downlink control channel (PDCCH) 222 (one symbol in the depicted downlink centric slot 200), one or more symbols assigned for communicating a physical downlink shared channel (PDSCH) 226 which may include a demodulation reference signal (DMRS) 224, and/or one or more symbols assigned for communicating an uplink short burst (ULSB) 230 (one symbol in the depicted downlink centric slot 200). Downlink centric slot 240 may similarly include symbols for transmitting a PDCCH 242, a PDSCH 246 which may include a DMRS 244, and/or a uplink short burst 250. The PDCCHs 222 and 242 may carry control information about data being transmitted in the respective slot (e.g., slot 220 or 240) and information about the resources (e.g., OFDM symbols) which the UE 110 may use for transmitting uplink data (e.g., in the uplink short burst 230, 250). The UE 110 can decode PDCCHs 222, 242 to determine resources for receiving/sending data. Additionally, PDCCHs 222, 242 may carry downlink control information (DCI) which may include resource assignments for a UE 110 or a group of UEs 110. Further, the base station 105 (e.g., a eNB or gNB, etc.) may transmit one or more PDCCHs in a slot. That is, the base station 105 may transmit multiple PDCCHs 222 and/or 242 over multiple symbols in slots 220 and 240, respectively.

In some implementations, a gap (e.g., guard interval) 228 may separate the PDSCH 226 and uplink short burst 230 to minimize or avoid interference (e.g., leakage from the PDSCH into resources assigned for the ULSB 230). Similarly, a gap 248 may separate PDSCH 246 and uplink short burst 250. The uplink short bursts 230, 250 (also referred to as a short burst) are generally configured in a manner such that all cells (e.g., in the vicinity) can follow the same uplink direction. In other words, a cell and neighbor cells of the cell may be configured so that common uplink bursts occur at or near the same time. The transmissions, with different burst durations, timings, and/or directions may lead to different interference conditions for regular and common uplink bursts.

In one example, in a single interlace self-contained transmission as illustrated in FIG. 2A, the base station 105 may transmit scheduling information at 212, the base station 105 may transmit data to UE 110 at 214, and/or the UE 110 may send feedback (e.g., ACK/NACK) for the data at 216, all within the same slot 220. The UE 110 may send feedback for the data received at the UE 110 by sending or transmitting an acknowledgement (ACK) or a negative ACK (NACK) depending on whether decoding of the data was successful at the UE 110. In a single interlace self-contained transmission, the UE 110 may receive data (e.g., at 214) from the base station 105 and transmit an ACK/NACK (e.g., at 216) during the same slot (e.g., slot 220) so that the base station 105 may transmit new scheduling information at 218 of a next slot (e.g., slot 240). For example, depending on whether the UE 110 sends an ACK or a NACK at 216, the base station 105 may send new (e.g., revised, updated, etc.) scheduling information or a re-transmission of the previous data in the PDSCH 246 of the next slot 240 (e.g., at 218).

Figure 2B:
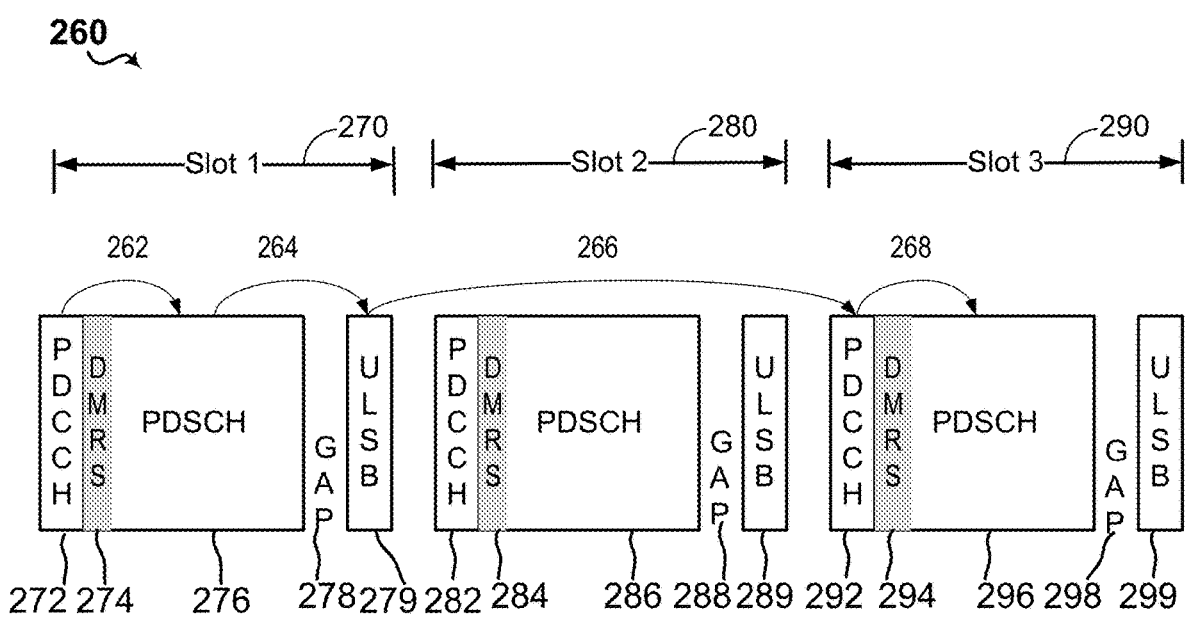
FIG. 2B illustrates an example of a two interlace self-contained transmission according to aspects of the present disclosure.

Referring to FIG. 2B, an example of a two interlace self-contained transmission 260 may comprise a slot (or frame) structure which may include downlink centric slots 270, 280, and/or 290. Although slots 270, 280, and/or 290 in FIG. 2B are shown with downlink centric slots, slots 220 and 240 may be a combination of downlink centric and/or uplink centric slots.

The downlink centric slot 270 may include one or more symbols for communicating a PDCCH 272, a PDSCH 276 which may include a DMRS 274, and/or a uplink short burst 279, as similarly described with reference to FIG. 2A above. The downlink centric slot 280 may include one or more symbols for communicating a PDCCH 282, a PDSCH 286 which may include a DMRS 284, and/or a uplink short burst 289. The downlink centric slot 290 may include one or more symbols for communicating a PDCCH 292, a PDSCH 296 which may include a DMRS 294, and/or a uplink short burst 299. The PDCCHs 272, 282, and/or 292 may carry control information about data being transmitted in the respective slot (e.g., slot 270, 280, or 290) and information about the resources (e.g., OFDM symbols) which UE 110 can use for transmitting uplink data. The UE 110 may decode the PDCCHs 272, 282, and/or 292 to determine resources over which to receive/send data. Additionally, the PDCCHs 272, 282, and/or 292 may carry downlink control information (DCI) which may include resource assignments for a UE 110 or a group of UEs 110. Further, the base station 105 (e.g., eNB or gNB, etc.) may transmit one or more PDCCHs in a slot. That is, in some examples, the base station 105 may transmit multiple PDCCHs 272, 282, and/or 292 over multiple symbols in slots 270, 280, and/or 290, respectively.

In some implementations, a gap (e.g., guard interval) 278 may separate the PDSCH 276 and uplink short burst 279 to minimize or avoid interference. Similarly, the gaps 288 and 298 may separate the PDSCH 286 and uplink short burst 289, and PDSCH 296 and uplink short burst 299, respectively. The uplink short bursts 279, 289, and/or 299 (also referred to as a short burst) are generally configured in a manner such that all cells (e.g., in the vicinity) can follow the same uplink direction. In other words, a cell and neighbor cells of the cell may be configured for common uplink bursts at or near the same time. The transmissions, with different burst durations, timings, and/or directions may lead to different interference conditions for regular and common uplink bursts.

In one example, in a two interlace self-contained transmission as illustrated in FIG. 2B, the base station 105 may transmit scheduling information at 262, base station 105 may transmit data to UE 110 at 264, and/or UE 110 may transmit feedback data for the data from the base station 105 at 266. That is, the UE 110 may transmit feedback data received at UE 110 by sending or transmitting an ACK/NACK depending on whether decoding of the data was successful at the UE 110. In a two interlace self-contained transmission, the UE 110 may receive data (e.g., during 264) from the base station 105 and transmit an ACK/NACK (e.g., during 264), but the base station 105 may not be able to receive and/or process the ACK/NACK in time for slot 280. In this example, the base station 105 may then transmit new scheduling information during a PDCCH (e.g., PDCCH 292) of a slot 290. For example, depending on whether the UE 110 sends an ACK or a NACK during 264, the base station 105 may send new (e.g., revised, updated, etc.) scheduling information during 266 of slot 290.

Figure 3A:
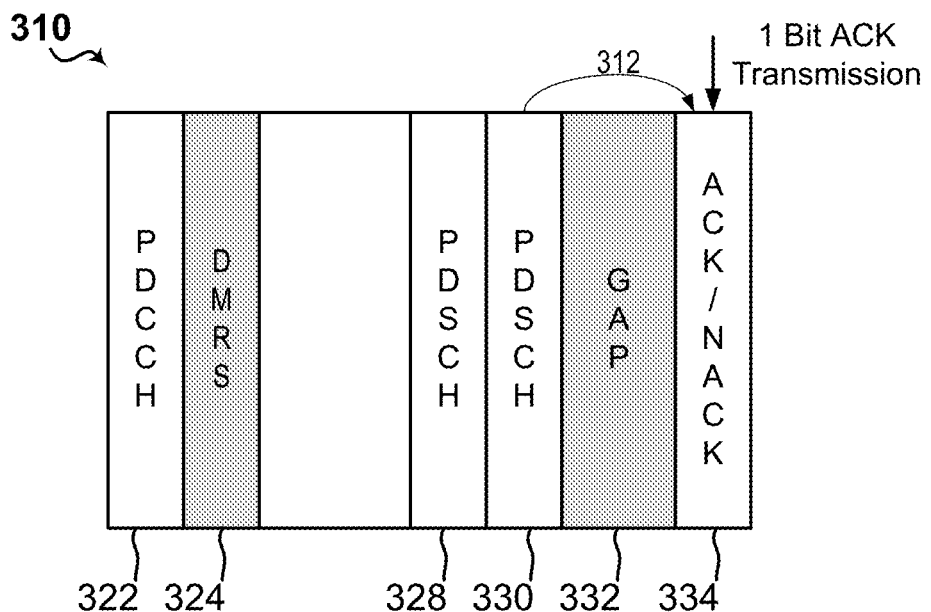
FIGS. 3A-3B illustrate examples of slot structures for communicating single-bit feedback according to aspects of the present disclosure.
Figure 3B:
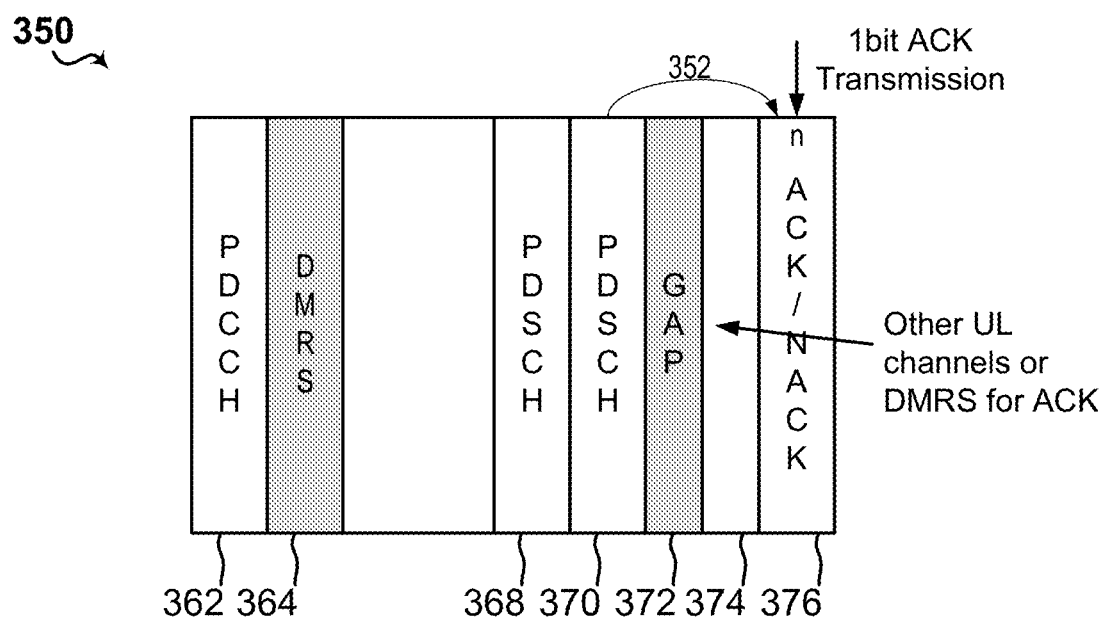

FIGS. 3A and 3B illustrate examples of slot structures for transmitting feedback.

FIG. 3A illustrates an example of a slot structure 310 where feedback can be transmitted in a downlink centric slot, where the slot includes one or more symbols for communicating a PDCCH 322, one or more symbols for communicating a DMRS 324, one or more symbols for communicating PDSCHs 328, 330, one or more symbols for instituting a GAP 332 and/or one or more symbols for communicating an uplink short burst (ULSB) 334. For example, the UE 110 may transmit feedback (e.g., ACK/NACK) in a last symbol of ULSB 334 (which may only include one symbol in this example).

FIG. 3B illustrates another example of a slot structure 350 where feedback can be transmitted in a downlink centric slot, where the slot includes one or more symbols for communicating a PDCCH 362, one or more symbols for communicating a DMRS 364, one or more symbols for communicating a PDSCHs 368, 370, one or more symbols for instituting a GAP 372 and/or two symbols 374 and 376 for communicating an uplink short burst (ULSB). For example, the ULSB in slot 350 is configured with two OFDM symbols 374, 376, and the UE 110 may transmit feedback (e.g., ACK/NACK) in a last symbol 376 of ULSB. In this example, OFDM symbol 374 may be used to transmit other channels, e.g., demodulation reference signal (DMRS) for ACK/NACKs, a sounding reference signal (SRS), a channel quality indicator (CQI), etc., by the UE 110 and/or other UEs. In either example, the use of a single bit for communicating feedback for all symbols/code blocks in the downlink channels may not by efficient. Described herein are more efficient acknowledgement mechanism to improve data rates and/or resource efficiency in wireless networks.

Figure 4A:
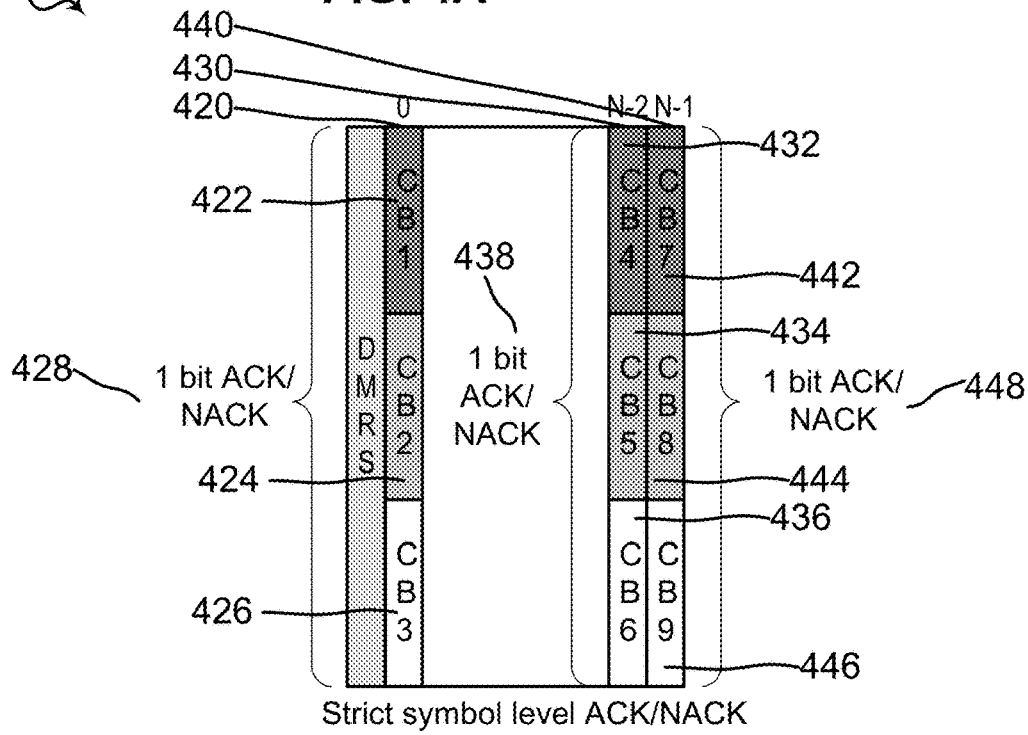
FIGS. 4A-4B illustrate examples of slot structures for transmitting code blocks and determining corresponding feedback bits according to aspects of the present disclosure.
Figure 4B:
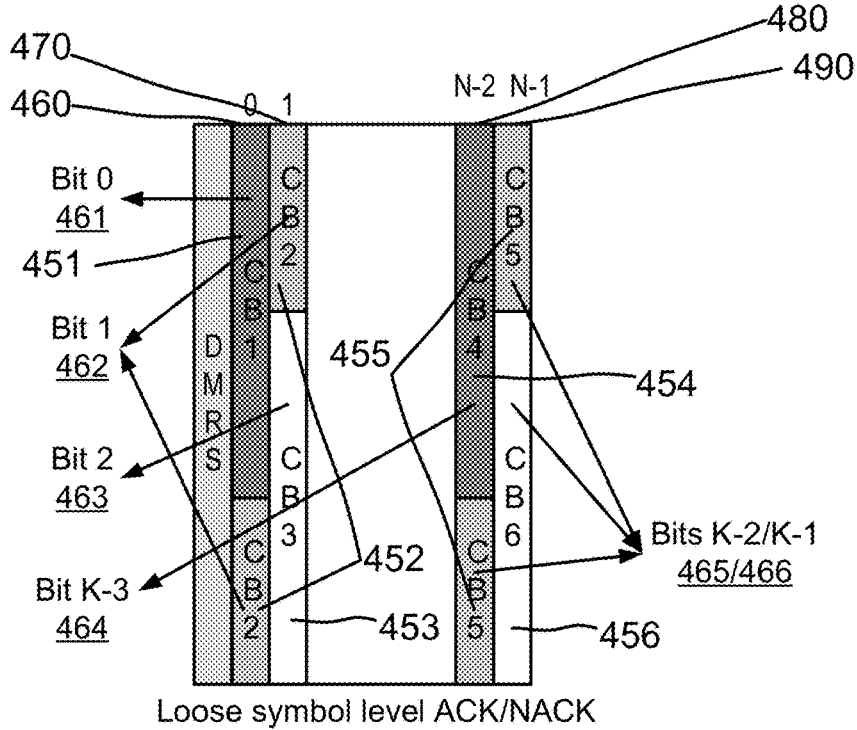

FIGS. 4A and 4B illustrate examples of PDSCH symbol configuration in a slot according to aspects of the present disclosure.

FIG. 4A illustrates a "strict" symbol level feedback configuration 410 for the PDSCH symbols. In this example, the base station 105 may transmit one or more symbols over the PDSCH 196 to the UE 110 with each symbol containing one or more integer number of code blocks (CBs) (e.g., only full code blocks in a given symbol, with no code blocks overlapping in multiple symbols), and thus feedback can be provided per symbol. For example, the base station 105 may transmit "N" number of symbols in the PDSCH region of the slot, e.g., symbol 0 (420), . . . , symbol N-2 (430), and symbol N-1 (440). Symbol 0 (420) may contain code blocks CB1 (422), CB2 (424), and CB3 (426); symbol N-2 (430) may contain code blocks CB4 (432), CB5 (434), and CB6 (436); symbol N-1 (440) may contain code blocks CB7 (442), CB8 (444), and CB9 (446). The base station 105 may transmit any number of symbols and/or each symbol may contain any number of code blocks.

On the receiving end, the UE 110 may receive the symbols transmitted over the PDSCH 196 from the base station 105, and in response to receiving and successfully decoding one or more code blocks associated with the symbols, the UE 110 may generate feedback for each of the one or more code blocks. The UE 110 may transmit message 160 to the base station 105 to indicate feedback for multiple code blocks. The message 160 may contain "K" number of bits, and may include one bit for each symbol (e.g., one feedback bit for all code blocks in a symbol). In other words, the value of K can be equal to the value of N. For example, if the UE 110 receives 10 symbols, the UE 110 may transmit the message 160 with 10 bits to indicate feedback for each of the 10 symbols. In one implementation, the UE 110 may acknowledge symbols received from the base station 105 by transmitting a 1-bit ACK/NACK for each symbol that is received from the base station 105 and successfully decoded at the UE 110. For instance, if the UE 110 successfully decodes the code blocks 422, 424, and 426 associated with symbol 0 420, the UE 110 may transmit a 1-bit ACK 428 to the base station 105. Alternatively, if the UE 110 fails to decode at least one of the code blocks 422, 424, and/or 426 associated with symbol 0 420, the UE 110 may transmit a 1-bit NACK 428 to the base station 105. This kind of mapping, a one-to-one mapping, e.g., a 1-bit ACK/NACK for every symbol may be referred to as "strict" symbol level ACK/NACK mechanism. Additionally, it should be noted that the last ACK/NACK bit 448 acknowledges all code blocks of the last symbol, e.g., symbol N-1.

FIG. 4B illustrates a "loose" symbol level feedback configuration 450 for the PDSCH symbols. In this example, base station 105 may transmit multiple symbols over the PDSCH 196 to the UE 110 with one or more of the symbols including one or more code blocks (CBs) that span symbols. In other words, one or more of the multiple symbols may contain a code block that is spread over two or more symbols. For example, the code block CB2 (452) is spread over symbol 0 (460) and symbol 1 (470); the code block CB5 (455) is spread over symbol N-2 (480) and symbol N-1 (490).

The base station 105 may transmit "N" number of symbols, e.g., symbol 0 (460), symbol 1 (470), . . . , symbol N-2 (480), and symbol N-1 (490). Symbol 0 (460) may contain a code block CB1 (451) and a portion of code block CB2 (452); symbol 1 (470) may contain a portion (e.g., a remaining portion) of code block CB2 (452) and code block CB3 (453); symbol N-2 (480) may contain a code block CB4 (454) and a portion of code block CB5 (455); symbol N-1 (490) may contain a portion (e.g., a remaining portion) of code block CB5 (455) and code block CB6 (456). The base station 105 may transmit any number of symbols and/or each symbol may contain any number of complete or partial code blocks. On the receiving end, the UE 110 may receive the symbols transmitted over the PDSCH 196 from the base station 105. Each symbol may contain one or more code blocks, full or partial code blocks, as described above. The UE 110, in response to receiving and successfully decoding a code block, may generate ACK/NACK feedback, and/or may transmit a message 160 to the base station 105 over one or more symbols to indicate the generated ACK/NACK feedback.

In one implementation, the message 160 may contain "K" number of bits, which may include one bit for each code block and/or a bit for multiple code blocks. For example, bit 0 (461) may be used to transmit an ACK for code block CB1 (451) if the UE 110 successfully decodes CB1 (451). Alternatively, bit 0 (461) may be used to transmit a NACK for code block CB1 (451) if the UE 110 is not successful in decoding CB1 (451). Similarly, bit 1 (462) may be used to transmit an ACK for code block CB2 (452) if the UE 110 successfully decodes CB2 (452). Alternatively, bit 1 (462) may be used to transmit a NACK for code block CB2 (452) if the UE 110 is not successful in decoding CB2 (452). Bit 2 (463) may be used to transmit an ACK for code block CB3 (453) if the UE 110 successfully decodes CB3 (453). Alternatively, bit 2 (463) may be used to transmit a NACK for code block CB3 (453) if the UE 110 is not successful in decoding CB3 (453). Bit K-3 (464) may be used to transmit an ACK for code block CB4 (454) if the UE 110 successfully decodes CB4 (454). Alternatively, bit K-3 (464) may be used to transmit a NACK for code block CB4 (454) if the UE 110 is not successful in decoding CB4 (454). Bits K-2 (465) and K-1 (466) may be used to transmit ACKs for code blocks CB5 (455) and CB6 (456) if the UE 110 successfully decodes code blocks CB5 (455) and CB6 (456), respectively. Alternatively, bits K-2 (465) and K-1 (466) may be used to transmit NACKs for code blocks CB5 (455) and CB6 (456) if the UE 110 fails to successfully decode code blocks CB5 (455) and CB6 (456), respectively. In an additional implementation, ACK/NACKs for code blocks CB5 (455) and CB6 (456) may be bundled into a single bit K-2 465 where the single bit can indicate NACK if the UE 110 fails to successfully decode at least one of CB5 (455) or CB6 (456), and ACK otherwise. In one example, UE 110 can bundle feedback for CBs that are at least partially in the last PDSCH symbol N-1 490, to provide simplified ACK/NACK encoding, which can allow the base station 105 to process the feedback before the next slot, as described further herein. This kind of mapping illustrated in FIG. 2B may be referred to as loose symbol level ACK/NACK mechanism.

In an additional implementation, 1 bit ACK/NACK may acknowledge two CBs and the last ACK/NACK bit may acknowledge 3 CBs, and hence the second ACK may acknowledge 1 CB.

Figure 5A:
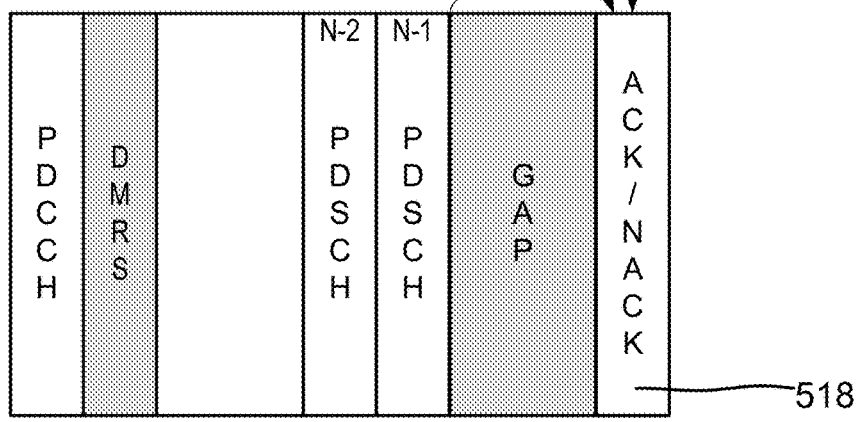
FIGS. 5A-5C illustrate examples of slot structures for transmitting at least one multi-bit feedback symbol according to aspects of the present disclosure.
Figure 5B:
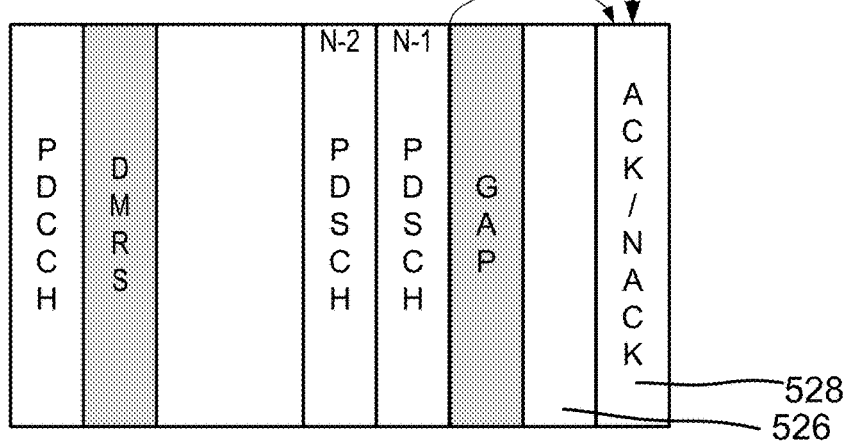
Figure 5C:
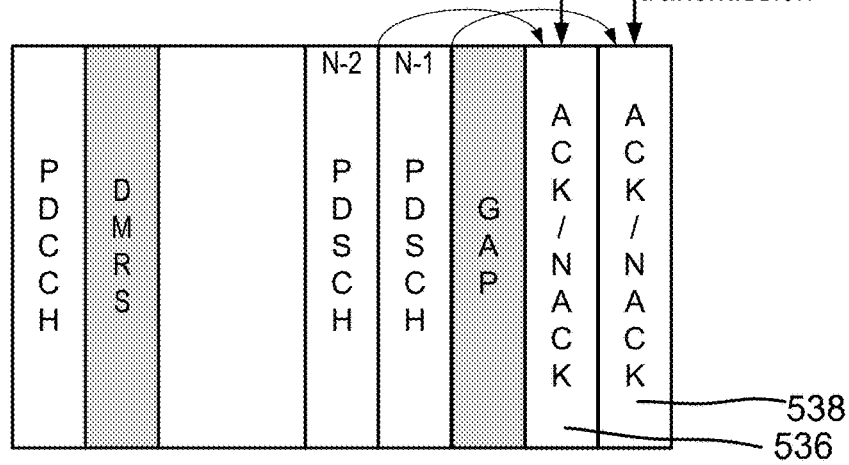

FIGS. 5A-5C illustrate examples of slot structures for transmitting feedback according to aspects of the present disclosure.

FIG. 5A illustrates an example of a slot structure 510 for transmitting feedback (e.g., message 160) using one symbol, according to aspects of the present disclosure. In one implementation, for example, the UE 110 may transmit feedback for symbols/code blocks received from the base station 105 in one symbol. For instance, the UE 110 may transmit a multi-bit ACK/NACK transmission to indicate ACK/NACK feedback in the message 160 for all symbols/code blocks (e.g., depending on whether the strict or loose level ACK/NACK mechanism is used) received over the PDSCH 196. Additionally, the message 160 may be a multi-bit ACK/NACK transmission. For example, the multi-bit ACK/NACK transmission 518 may include in multiple ACK/NACK bits encoded (e.g., by the UE 110) using a Polar code, Reed-Muller code, or other encoding. In this example, the base station 105 can decode the multi-bit ACK/NACK transmission 518 to determine ACK/NACK feedback for multiple symbols/code blocks transmitted by the base station 105.

FIG. 5B illustrates an example of a slot structure 520 for transmitting feedback (e.g., message 160) using a last symbol of a plurality of symbols (e.g., last symbol of two symbols) in an uplink short burst according to aspects of the present disclosure. In one implementation, for example, the UE 110 may transmit feedback for symbols/code blocks received from the base station 105 in symbol 528. For instance, the transmission of message 160 using the last symbol 528 may provide sufficient time for the UE 110 to process symbols/code blocks (e.g., data) received from the base station 105 and/or to transmit the message 160 to the base station 105. Additionally, the message 160 may be a multi-bit ACK/NACK transmission. For example, the multi-bit ACK/NACK transmission in the last symbol 528 may include in multiple ACK/NACK bits encoded (e.g., by the UE 110) using a Polar code, Reed-Muller code, or other encoding. In this example, the base station 105 can decode the multi-bit ACK/NACK transmission in the last symbol 528 to determine ACK/NACK feedback for multiple symbols/code blocks transmitted by the base station 105.

FIG. 5C illustrates an example of a slot structure 530 for transmitting feedback (e.g., message 160) using a plurality of symbols (e.g., two symbols) in an uplink short burst according to aspects of the present disclosure. The "K" number of ACK/NACK bits may be split into two portions. The first portion, which may correspond to feedback for code blocks other than those fully or partially within a last PDSCH symbol, may be transmitted in a first symbol, e.g., symbol 536, and the second portion, which may correspond to feedback for code blocks fully or partially within a last PDSCH symbol, may be transmitted in a last symbol, e.g., symbol 538. For instance, the transmission of the K-1 ACK/NACK bit using last symbol 538 for data received in the last PDSCH symbol may provide sufficient time for the UE 110 to process last symbols/code blocks (e.g., data) received from the base station 105 and/or to transmit the message 160 to the base station 105. In addition, providing the one bit ACK/NACK in the last symbol 538 (e.g., as opposed to a multi-bit ACK/NACK), may allow the base station 105 to have enough time to process the feedback for scheduling communications in the next slot (e.g., which may be beneficial for single-interlace self-contained communications), as processing the one bit feedback may not be as complicated or take as much time/resources as compared to processing the multi-bit feedback (e.g., using Polar or Reed-Muller decoding).

Other implementations are possible, such as where each portion may be half of the ACK/NACK payload (e.g., about equally split). Additionally, whether transmitted over symbol 536 and/or 538, the message 160 may be a multi-bit ACK/NACK transmission. For example, the multi-bit ACK/NACK transmission in symbol 536 may include in multiple ACK/NACK bits encoded (e.g., by the UE 110) using a Polar code, Reed-Muller code, or other encoding, and the ACK/NACK transmission over symbol 538 may include multiple ACK/NACK bits encoded using a repetition coding (e.g., to bundle feedback for multiple code blocks in the last symbol or to provide the feedback of one code block in the last symbol). In this example, the base station 105 can decode the multi-bit ACK/NACK transmission in symbol 536 and/or the single bit ACK/NACK transmission in symbol 538 to determine ACK/NACK feedback for multiple symbols/code blocks transmitted by the base station 105.

Figure 6:
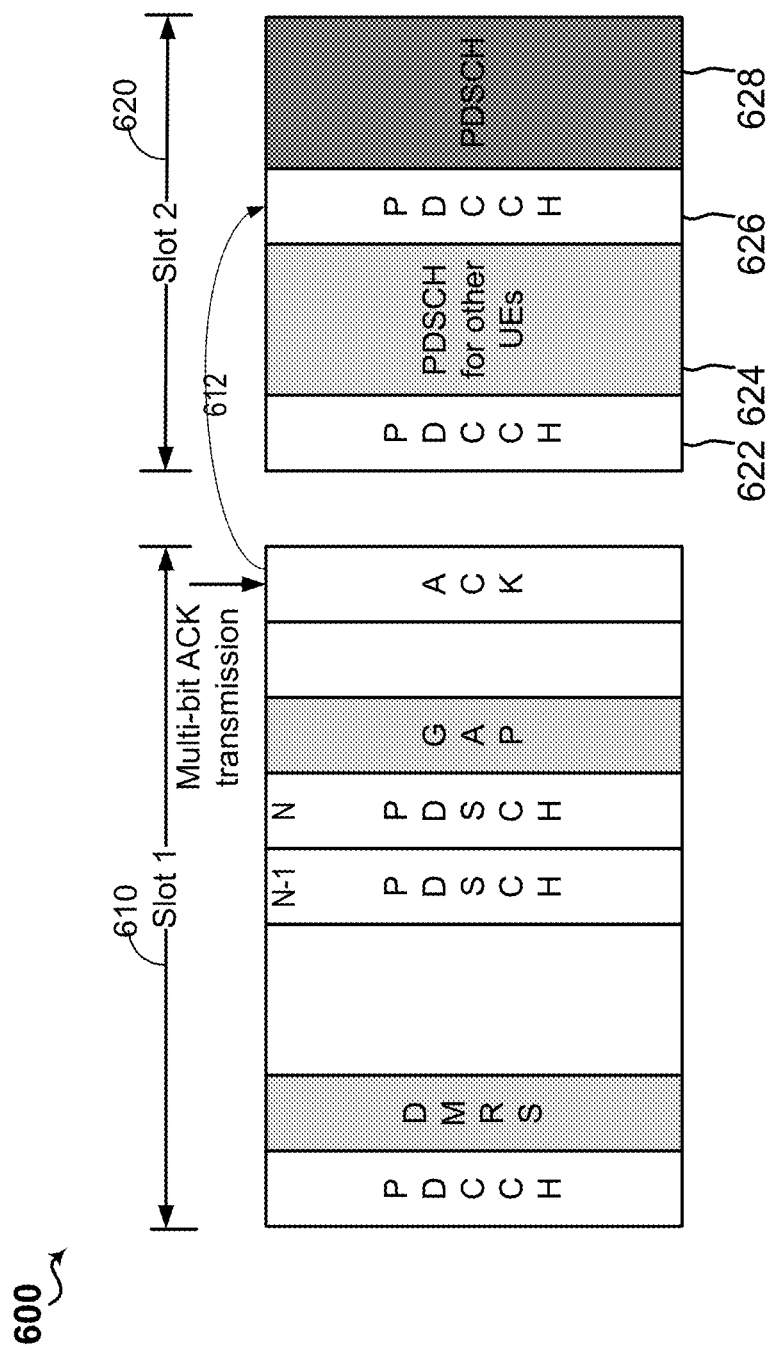
FIG. 6 illustrates an example of a slot structure for scheduling resources based on receiving a multi-bit feedback transmission according to aspects of the present disclosure.

FIG. 6 illustrates an example of a slot structure 600 for transmitting feedback and selecting symbols for transmitting subsequent data communications according to aspects of the present disclosure.

In one implementation, for example, the UE 110 may use one symbol for transmitting the feedback in message 160, which may include a multi-bit ACK transmission, as described above. In such an implementation, the base station 105 may delay scheduling (e.g., scheduling of new transmissions or re-transmissions) in the following slot, e.g., by selecting one or more symbols after a number of initial symbols in slot 2 (620) (e.g., in the middle of the slot), such as the symbol for transmitting PDCCH 626. In this example, the base station 105 may schedule a different UE for DL data transmission in the initial symbols before PDCCH 626, e.g., schedule other UEs, using the PDCCH 622, for resources in the PDSCH 624. This may result in rate reduction at the UE 110 as the PDSCH 628 which may be intended for the UE 110 may be limited in symbols of slot 2 (620) that it can occupy.

In another implementation, as described above with respect to slot structure 530 in FIG. 5C for example, the UE 110 may use two symbols to transmit the message 160 to the base station 105. In such an implementation, the base station 105 may delay scheduling (e.g., scheduling of new transmissions or re-transmissions) in the following slot, e.g., by selecting one or more symbols after a number of initial symbols in slot 2 (620) (e.g., in the middle of the slot), such as the symbol for transmitting PDCCH 626, in a similar manner described above with respect to one symbol. In an additional implementation, ACK/NACK bits may be split into portions. The first symbol may be used to transmit ACK/NACK bits for code blocks other than those in the last PDSCH symbol, and the second (e.g., last) symbol may be used to transmit the last ACK/NACK bit for code blocks in the last PDSCH symbol. The decoding of one bit of an ACK/NACK transmission may be less complex than decoding multiple jointly encoded ACK/NACK feedback indicators which may be, for example, encoded with Polar code or Reed-Muller codes. Therefore, splitting and transmitting ACK/NACK feedback (e.g., message 160) into at least two portions with K-1 ACK/NACK bits in the first symbol and one ACK/NACK bit in the last symbol respectively may allow base station 105 to finish/complete ACK/NACK decoding of the two portions in roughly the same time and may still have sufficient time to transmit scheduling (e.g., scheduling of new transmissions or re-transmissions) in the beginning of the following slot, e.g., PDCCH 622 in the first symbol of slot 2 620.

Figure 7:
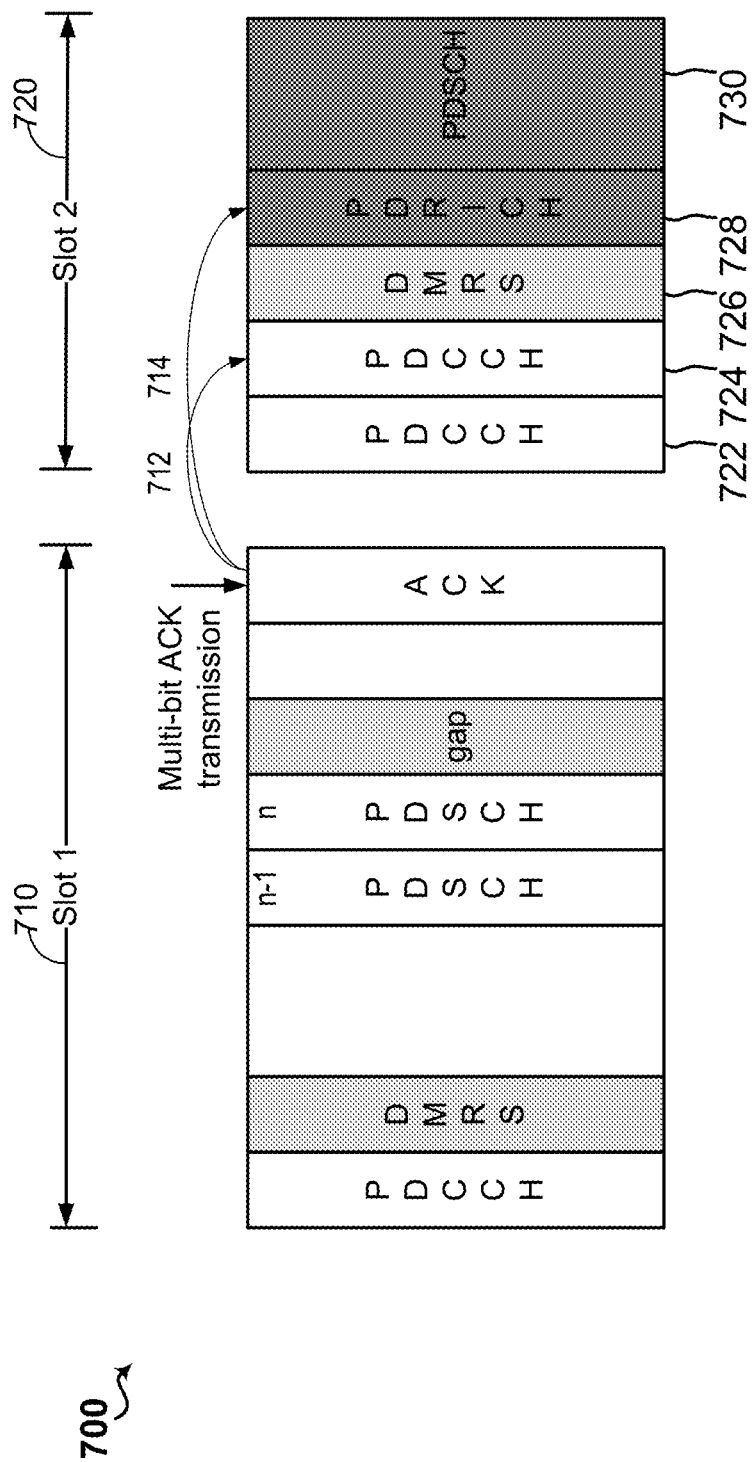
FIG. 7 illustrates an example of a slot structure for scheduling resources after a retransmission indicator channel based on receiving a multi-bit feedback transmission according to aspects of the present disclosure.

FIG. 7 illustrates an example of a slot structure 700 for transmitting feedback and selecting symbols for transmitting subsequent data communications according to aspects of the present disclosure.

As described above, the processing of ACK/NACKs by the base station 105 may take an amount of time that may prevent the base station 105 from scheduling subsequent transmissions to the UE (based on the feedback) at the beginning of the next slot. In addition, however, the scheduling of other UEs as described in reference to FIG. 6 may not be desirable due to reduction to data rates. Therefore, in one implementation, the base station 105 can include more than one symbol in the downlink control region, for example, two PDCCHs 722 and 724, and the base station 105 may defer downlink control information (DCI) containing re-transmission information to a downlink control symbol after the first symbol in the slot 720. For example, DCI may be deferred to the PDCCH 724. In another implementation, re-transmission information (e.g., DCI) may be deferred to the PDSCH region, e.g., in a physical downlink retransmission indicator channel (PDRICH) 728. The PDRICH can include a new data indicator (NDI), a redundancy version (RV), a modulation and coding scheme (MCS), and/or the like, and may be transmitted outside PDCCH region (when needed), may be coded/transmitted differently from PDCCH, etc. In a further additional implementation, the beginning of the PDSCH region along with the PDRICH may be transmitted after DMRS symbol, e.g., symbol for DMRS 726 which may provide additional time for the base station 105 to process feedback and transmit new scheduling information to the UE 110 based on the feedback.

Figure 8:
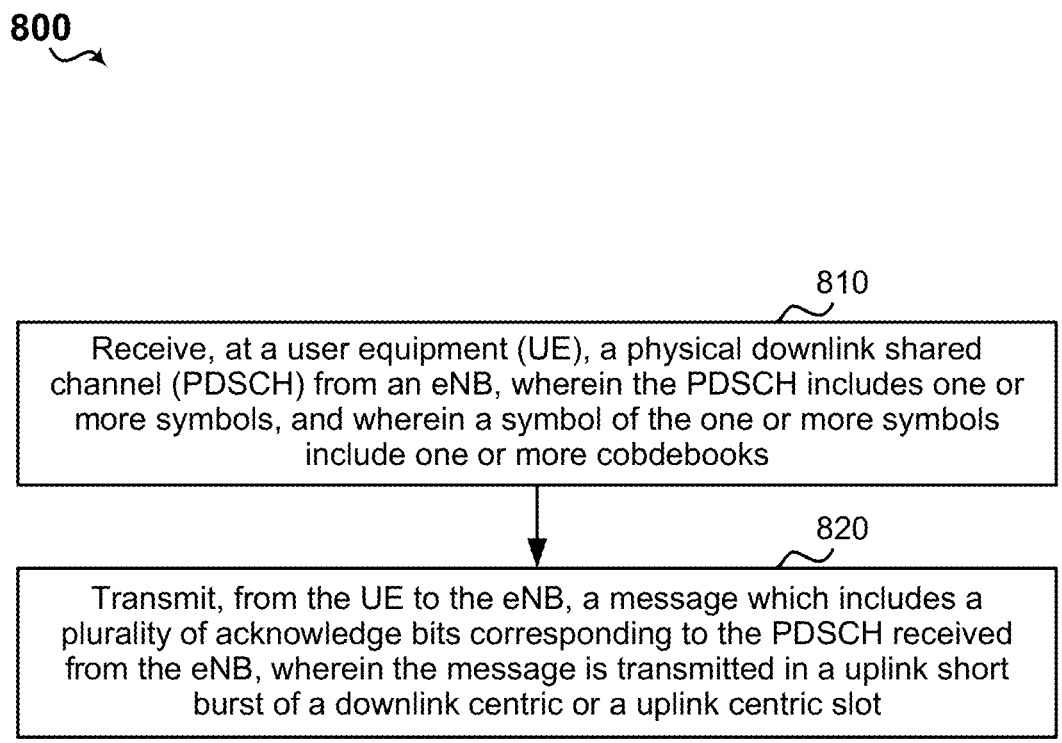
FIG. 8 is a flow diagram of an example method of acknowledging messages in wireless communications according to an aspect of the present disclosure.

Referring to FIG. 8, for example, a method 800 of acknowledging messages in wireless communications at a user equipment (UE) 110 according to the above-described aspects is disclosed.

For example, at 810, the method 800 includes receiving, at a user equipment (UE), a physical downlink shared channel (PDSCH) from a base station, wherein the PDSCH includes one or more symbols, and wherein each symbol of the one or more symbols includes one or more code blocks. For instance, in an aspect, the UE 110 and/or modem 140 may execute the communications component 150 and/or PDSCH receiving component 152 to receive a PDSCH, e.g., user data, from base station 105 over PDSCH 196. The base station 105 may transmit the PDSCH 196 over one or more OFDM symbols, and each of the one or more ODFM symbols may contain (e.g., include) one or more code blocks. The OFDM symbols may be full OFDM symbols or partial symbols depending on configuration and/or data rates. Further, each code block may span over one or more symbols, as described in reference to FIG. 4B Further, at 820, the method 800 includes transmitting, from the UE to the base station, a message which includes a plurality of acknowledge bits corresponding to the PDSCH received from the base station, wherein the message is transmitted in a uplink short burst of a downlink centric or a uplink centric slot. For instance, in an aspect, the UE 110 and/or modem 140 may execute the communications component 150 and/or ACK/NACK transmitting component 154 to transmit the message 160 to the base station 105. Further, the message 160 is transmitted in an uplink short burst of a downlink centric or an uplink centric slot.

In one implementation, the message 160 may include a plurality of acknowledge bits corresponding to the PDSCH 196 received from the base station 105. Each acknowledge bit of the plurality of bits may indicate whether decoding of a symbol being acknowledged by the bit is successful when the symbol contains an integer number of code blocks (e.g., strict symbol level ACK/NACK mechanism, FIG. 4A) or decoding of a code block of a symbol being acknowledged by the bit is successful when one or more of the symbols contain a non-integer number of code blocks (e.g., loose symbol level ACK/NACK mechanism, FIG. 4B). In other words, the message 160 may include a plurality of bits, which may be ACKs/NACKs associated with symbols/code blocks based on whether the symbols/code blocks were successfully decoded at the UE 110.

For example, as described above in reference to FIG. 4A, symbol 0 (422) may include three code blocks, e.g., CB1 (422), CB2 (424), and CB3 (426). In one example, the UE 110 may transmit an ACK (e.g., 1 bit of a multi-bit ACK) when the UE 110 successfully decodes all three code blocks, e.g., CB1 (422), CB2 (424), and CB3 (426). Alternatively, if at least one of three code blocks is not successfully decoded at the UE 110, the UE 110 may transmit a NACK to the base station 105. In another example, as described above in reference to FIG. 4B, the UE 110 may transmit an ACK (e.g., 1 bit ACK, Bit 0 (461), of a multi-bit ACK) when the UE 110 successfully decodes CB1 (451). Alternatively, if the UE 110 fails to decode the CB1 (451), the UE 110 may transmit a NACK to the base station 105.

Further, in one implementation, the UE 110 and/or communications component 150 may transmit the message 160 in an uplink short burst of a downlink centric slot or an uplink centric slot to minimize delay in sending/transmitting acknowledgements to the base station 105. Further, the uplink short burst or message 160 may be transmitted over one or more symbols as described above in reference to FIGS. 5A-5C, 6, and 7, and/or each symbol may be a full or a partial OFDM symbol.

Thus, as described above, communications component 150 acknowledges messages in wireless communications in an efficient and timely manner.

Figure 9:
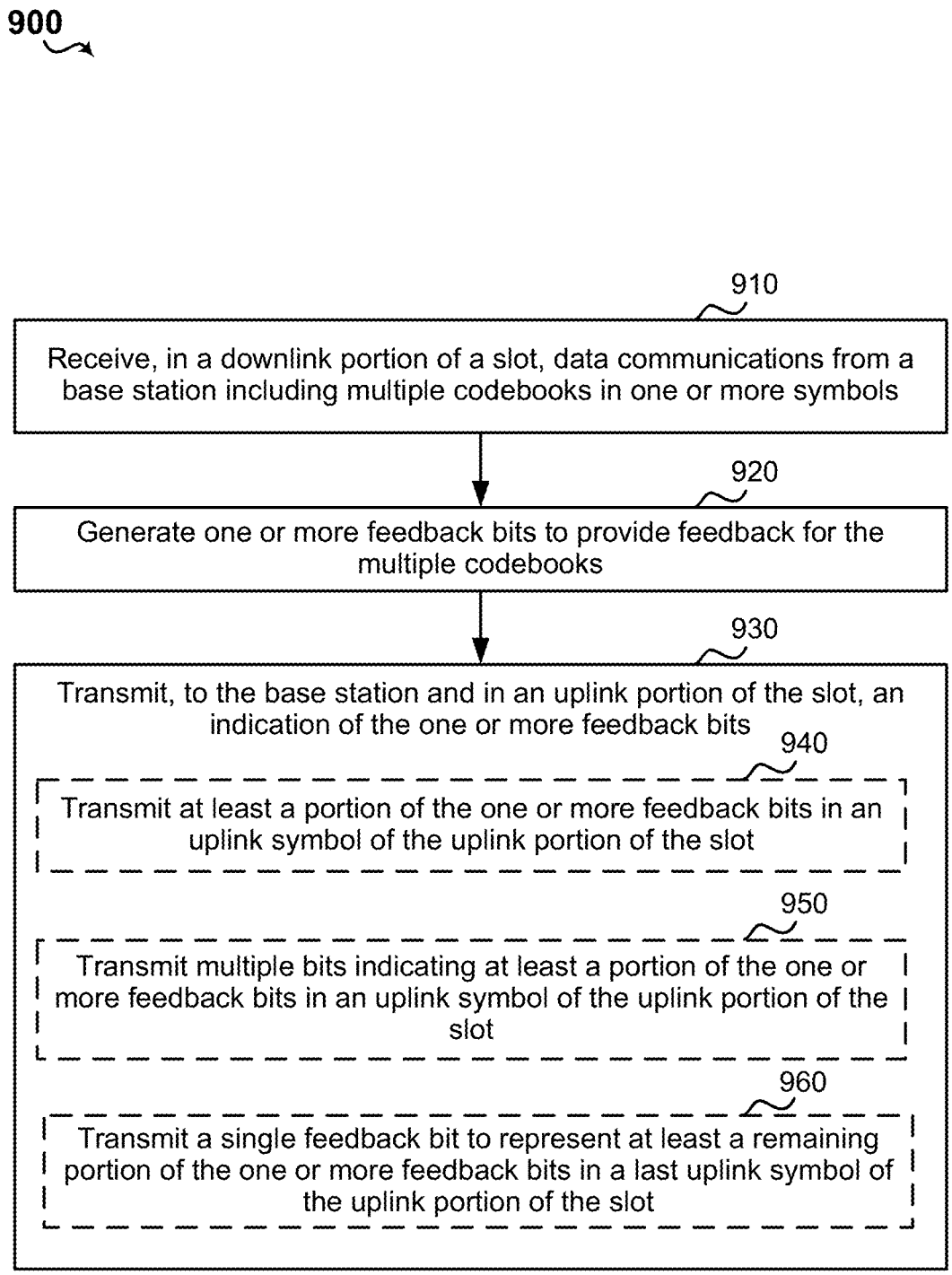
FIG. 9 is a flow diagram of an example method of transmitting an indication of feedback bits according to an aspect of the present disclosure.

Referring to FIG. 9, for example, a method 900 of transmitting feedback for communications received from a base station is disclosed.

For example, at 910, the method 900 includes receiving, in a downlink portion of a slot, data communications from a base station including multiple code blocks in one or more symbols. In an aspect, PDSCH receiving component 152, e.g., in conjunction with modem 140, communications component 150, processor(s) 1112, memory 1116, transceiver 1102 (as described in FIG. 11), etc., can receive, in the downlink portion of the slot, data communications from the base station (e.g., base station 105) including multiple code blocks in one or more symbols. For example, the base station 105 can transmit, and the PDSCH receiving component 152 can receive, the multiple code blocks, such as CB1 422, CB2 424, CB3 426, . . . CB 4 432, CB5 434, CB6 436, CB7 442, CB8 444, CB9 446, etc. as complete (e.g., full) CBs in each of the PDSCH symbols 0 to N-1 in FIG. 4A, CB1 451, CB2 452, CB3 453, . . . CB4 454, CB5 455, CB6 456, etc. in each of the PDSCH symbols 0 to N-1 in FIG. 4B where one or more of the CBs (e.g., CB2 452 and CB5 455) are spread over two symbols, etc. Additionally, the downlink portion of the slot can include a number of downlink symbols before a gap and/or uplink symbols, such as one or more of symbols for PDSCHs 328, 330 in slot structure 310, one or more of symbols for PDSCHs 368, 370 in slot structure 350, one or more of the PDSCH symbols in slot structures 510, 520, 530, 610, 710, etc.

For example, at 920, the method 900 includes generating one or more feedback bits to provide feedback for the multiple code blocks. In an aspect, ACK/NACK transmitting component 154, e.g., in conjunction with modem 140, communications component 150, processor(s) 1112, memory 1116, transceiver 1102 (as described in FIG. 11), etc., can generate the one or more feedback bits to provide feedback for the multiple code blocks. For example, ACK/NACK transmitting component 154 can generate one or more feedback bits for each of the code blocks based on whether the UE 110 is able to successfully decode a given code blocks. In an example, ACK/NACK transmitting component 154 can generate a feedback bit for each code block, but may not transmit all of the feedback bits, may multiplex some of the feedback bits, may transmit feedback bits per symbol instead of per code block, etc., as described herein. In another example, the ACK/NACK transmitting component 154 may generate feedback bits for a portion of the code blocks (e.g., only one ACK bit, which may change to a NACK bit where one of multiple code blocks are not successfully decoded, only ACK bits, only NACK bits, etc.).

For example, at 930, the method 900 includes transmitting, to the base station and in an uplink portion of the slot, an indication of the one or more feedback bits. In an aspect, ACK/NACK transmitting component 154, e.g., in conjunction with modem 140, communications component 150, processor(s) 1112, memory 1116, transceiver 1102 (as described in FIG. 11), etc., can transmit, to the base station (e.g., base station 105) and in the uplink portion of the slot, the indication of the one or more feedback bits.

In one example, transmitting the one or more feedback bits at 930 can optionally include, at 940, transmitting at least a portion of the one or more feedback bits in an uplink symbol of the uplink portion of the slot. For example, ACK/NACK transmitting component 154 can multiplex or otherwise encode at least the portion of the one or more feedback bits for transmission, such as by using a Polar code, Reed-Muller code, etc., and can transmit the encoded one or more feedback bits in a given symbol of an uplink short burst in the slot.

In this examples above, ACK/NACK transmitting component 154 can encode and/or transmit feedback bits for CB1 422, CB2 424, CB3 426, . . . CB 4 432, CB5 434, CB6 436, CB7 442, CB8 444, CB9 446, etc. in each of the PDSCH symbols 0 to N-1 in FIG. 4A, CB1 451, CB2 452, CB3 453, . . . CB4 454, CB5 455, CB6 456, etc. in each of the PDSCH symbols 0 to N-1 in FIG. 4B, etc. In one example, this may include encoding and/or transmitting all of the feedback bits (e.g., where the feedback is transmitted over a single symbol in the ULSB). In another example, this may include encoding and/or transmitting the feedback bits other than those corresponding to feedback for code blocks in a last PDSCH symbol (e.g., where the feedback is transmitted over multiple symbols in the ULSB, in which case another symbol may include an indication for the remaining feedback bits, as described above and further below).

In another example, transmitting the one or more feedback bits at 930 can optionally include, at 950, transmitting multiple bits indicating at least a portion of the one or more feedback bits in an uplink symbol of the uplink portion of the slot. For example, ACK/NACK transmitting component 154 can multiplex or otherwise encode the multiple bits for transmission, such as by using a Polar code, Reed-Muller code, etc., and can transmit the encoded multiple bits in a given symbol of an uplink short burst in the slot. For example, the multiple bits can each correspond to feedback for a given symbol (e.g., in the strict symbol level configuration in FIG. 4A) or other collection of multiple code blocks. For example, at least one of the multiple bits can be determined as a collective feedback value for multiple code blocks corresponding to the bit, such as a single bit for CB1 422, CB2 424, and CB3 426, a single bit for CB 4 432, CB5 434, and CB6 436, and a single bit for CB7 442, CB8 444, and CB9 446, etc. in FIG. 4A. In one example, this may include encoding and/or transmitting multiple bits corresponding to all of the generated feedback bits (e.g., where the feedback is transmitted over a single symbol in the ULSB). In another example, this may include encoding and/or transmitting the multiple bits corresponding to feedback for code blocks other than those in a last PDSCH symbol (e.g., where the feedback is transmitted over multiple symbols in the ULSB, in which case another symbol may include a separate bit for the remaining feedback bits, as described above and further below).

In another example, transmitting the one or more feedback bits at 930 can optionally include, at 960, transmitting a single feedback bit to represent at least a remaining portion of the one or more feedback bits in a last uplink symbol of the uplink portion of the slot. For example, where ACK/NACK transmitting component 154 can transmit feedback over multiple symbols in a ULSB, the ACK/NACK transmitting component 154 can transmit most feedback bits over one symbol, and may transmit a single feedback bit representing remaining feedback bits in the last symbol.

For example, the ACK/NACK transmitting component 154 can transmit feedback bits generated for CBs received in full in all but a last received PDSCH symbol in the first ULSB symbol, and can transmit the single feedback bit generated for CB(s) (e.g., using a repetition code or other encoding for multiple CBs) at least partially received in the last received PDSCH symbol in the second ULSB symbol. This can include transmitting the feedback bits for each of CB1 451, CB2 452, CB3 453, . . . CB4 454, etc., in FIG. 4B, which can be based on a multiplexing or encoding of the bits using a Polar code, Reed-Muller code, or similar code, in the first (one or more) ULSB symbol(s) and then transmitting a single feedback bit for CB5 455 and CB6 456 (e.g., using a repetition code or other bundling mechanism) in the last ULSB symbol.

In another example, the ACK/NACK transmitting component 154 can transmit multiple bits representative of feedback for CBs in all but a last received PDSCH symbol in the first ULSB symbol (e.g., in a strict symbol level configuration), and can transmit the single feedback bit generated for CB(s) in the last received PDSCH symbol in the second ULSB symbol. This can include transmitting multiple bits including a single bit for CB1 422, CB2 424, and CB3 426, a single bit for CB 4 432, CB5 434, and CB6 436, in FIG. 4A, which can be based on a multiplexing or encoding of the bits using a Polar code, Reed-Muller code, or similar code, in the first (one or more) symbols of the ULSB, and transmitting a single bit for CB7 442, CB8 444, CB9 446, etc. in the last symbol of the ULSB.

In the above examples, the base station 105 can receive and decode the feedback bits transmitted in the one or more symbols of the ULSB, and can accordingly schedule subsequent communications for the UE 110 in a next slot. For example, transmitting the single bit feedback in the last ULSB symbol (e.g., and other feedback in an earlier symbol in the ULSB) may allow the base station 105 enough time to process the feedback and schedule communications for the UE 110 in the next slot. In other examples, as described herein, the base station 105 can, additionally or alternatively, modify scheduling to allow enough time for scheduling the UE 110 based on received feedback (e.g., where the last ULSB include a multi-bit feedback transmission).

Figure 10:
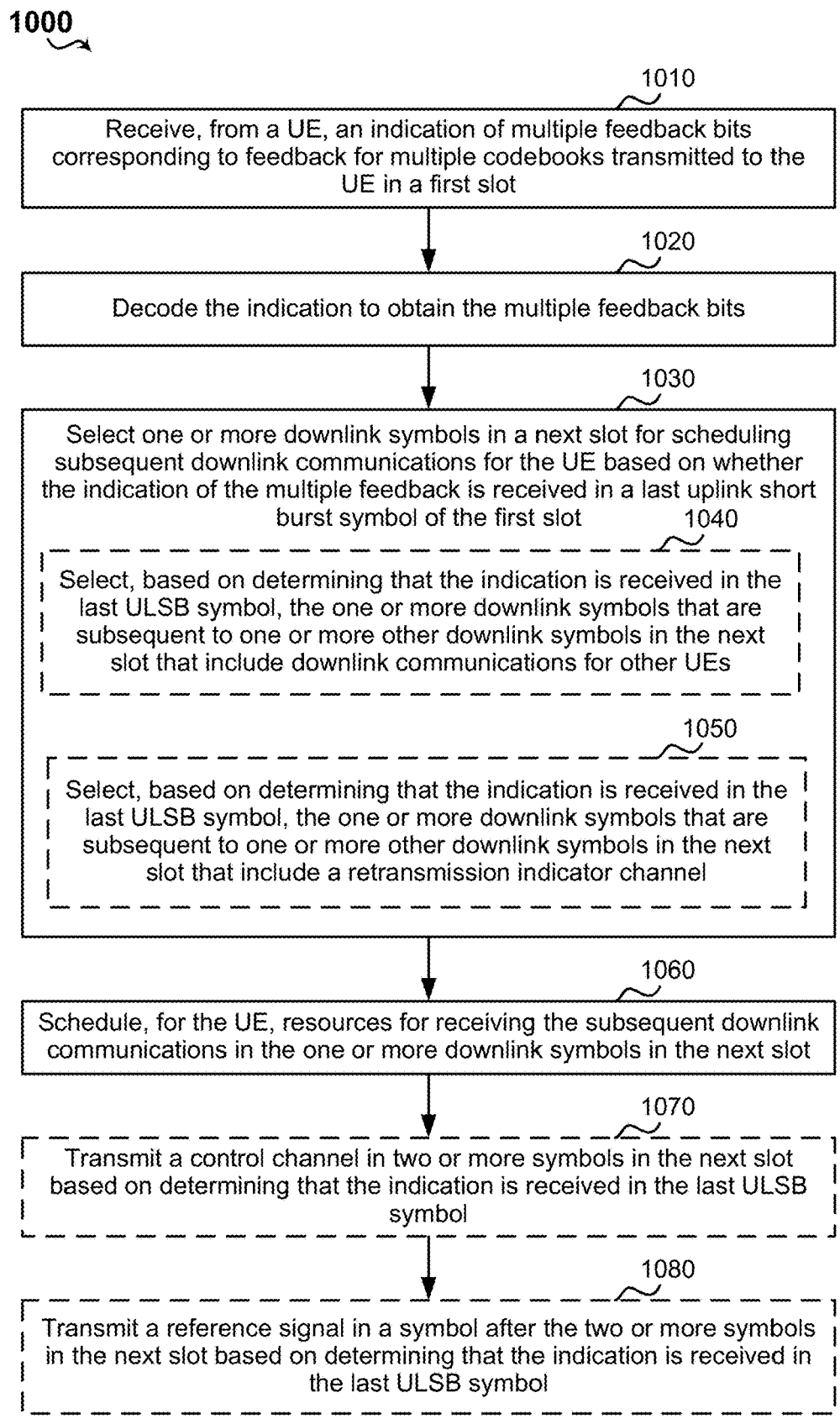
FIG. 10 is a flow diagram of an example method of scheduling resources based on feedback according to an aspect of the present disclosure.

Referring to FIG. 10, for example, a method 1000 of scheduling communications for a UE based on received feedback is disclosed.

For example, at 1010, the method 1000 includes receiving, from a UE, an indication of multiple feedback bits corresponding to feedback for multiple code blocks transmitted to the UE in a first slot. In an aspect, PDSCH transmitting component 192, e.g., in conjunction with modem 180, communications component 190, processor(s) 1212, memory 1216, transceiver 1202 (as described in FIG. 12), etc., can transmit multiple code blocks over one or more PDSCH symbols to a UE 110, as described above, and ACK/NACK component 194 can receive, from the UE (e.g., UE 110), the indication of multiple feedback bits corresponding to feedback for the multiple code blocks transmitted to the UE in the first slot. For example, the UE 110 can generate and transmit the multiple feedback bits as described in reference to FIG. 9, above, and may thus include a multi-bit feedback transmission over a single symbol, a multi-bit feedback transmission over one symbol followed by a single-bit feedback transmission in another symbol in the slot, etc.

For example, at 1020, the method 1000 includes decoding the indication to obtain the multiple feedback bits. In an aspect, ACK/NACK component 194, e.g., in conjunction with modem 180, communications component 190, processor(s) 1212, memory 1216, transceiver 1202 (as described in FIG. 12), etc., can decode the indication to obtain the multiple feedback bits. For example, ACK/NACK component 194 can decode a symbol that includes multi-bit feedback by using a Polar code, Reed-Muller code, or other code used by the UE 110 to encode the feedback bits. In addition, for example, where a last symbol in the ULSB includes a single-bit feedback transmission, ACK/NACK component 194 can decode the symbol to obtain the single-bit feedback for code block(s) transmitted in the last PDSCH symbol. ACK/NACK component 194 can accordingly determine, based on the decoded feedback bits, whether to retransmit one or more code blocks, one or more corresponding symbol(s) that carried the one or more code blocks, etc. in the next slot.

For example, at 1030, the method 1000 includes selecting one or more downlink symbols in a next slot for scheduling subsequent downlink communications for the UE based on whether the indication of the multiple feedback is received in a last uplink short burst symbol of the first slot. In an aspect, ACK/NACK component 194, e.g., in conjunction with modem 180, communications component 190, processor(s) 1212, memory 1216, transceiver 1202 (as described in FIG. 12), etc., can select the one or more downlink symbols in the next slot for scheduling subsequent downlink communications for the UE based on whether the indication of the multiple feedback is received in the last uplink short burst symbol of the first slot. For example, ACK/NACK component 194 can select the one or more downlink symbols in the next slot (e.g., slot 2 620, 720) based on whether ACK/NACK feedback is received in the last ULSB symbol of the first slot (e.g., slot 1 610, 710).

For example, selecting the one or more downlink symbols at 1030 may optionally include, at 1040, selecting, based on determining that the indication is received in the last ULSB symbol, the one or more downlink symbols that are subsequent to one or more other downlink symbols in the next slot that include downlink communications for other UEs. For example, ACK/NACK component 194 can select, in this example, one or more downlink symbols after PDSCHs for other UEs (e.g., the symbols for PDCCH 626 and/or PDSCH 628 after PDSCH 624 in FIG. 6). This can allow the base station 105 to have extra time to process the multi-bit ACK transmission in the last ULSB symbol in slot 1 610 before scheduling communications for the UE 110 in the downlink symbols (e.g., for PDCCH 626 and/or PDSCH 628) of slot 2 620.

For example, selecting the one or more downlink symbols at 1030 may optionally include, at 1050, selecting, based on determining that the indication is received in the last ULSB symbol, the one or more downlink symbols that are subsequent to one or more other downlink symbols in the next slot that include a retransmission indicator channel. For example, ACK/NACK component 194 can select, in this example, one or more downlink symbols after the PDRICH (e.g., symbols for PDSCH 730 after symbol for PDRICH 728 in FIG. 7). In one example, the PDRICH 728 may include an indication of retransmission for the UE 110 as well. In either case, this can allow the base station 105 to have extra time to process the multi-bit ACK transmission in the last ULSB symbol in slot 1 710 before scheduling communications for the UE 110 in the downlink symbols for PDSCH 730 of slot 2 720.

For example, at 1060, the method 1000 includes scheduling, for the UE, resources for receiving the subsequent downlink communications in the one or more downlink symbols in the next slot. In an aspect, ACK/NACK component 194, e.g., in conjunction with modem 180, communications component 190, processor(s) 1212, memory 1216, transceiver 1202 (as described in FIG. 12), etc., can schedule, for the UE (e.g., UE 110), resources for receiving the subsequent downlink communications in the one or more downlink symbols in the next slot. For example, ACK/NACK component 194 can schedule the UE 110 and can transmit scheduling information in the corresponding PDCCH and/or PDRICH (e.g., PDCCH 626 in FIG. 6, PDCCH 724, PDRICH 728, etc. in FIG. 7, and/or the like).

For example, at 1070, the method 1000 optionally includes transmitting a control channel in two or more symbols in the next slot based on determining that the indication is received in the last ULSB symbol. In an aspect, ACK/NACK component 194, e.g., in conjunction with modem 180, communications component 190, processor(s) 1212, memory 1216, transceiver 1202 (as described in FIG. 12), etc., can transmit the control channel in the two or more symbols in the next slot based on determining that the indication is received in the last ULSB symbol. For example, ACK/NACK component 194 can determine to transmit PDCCH in two or more symbols (e.g., symbols of PDCCHs 722, 724) in the next slot (e.g., slot 2 720) based on determining that the indication is received in the last ULSB symbol of slot 1 710. This can allow the base station 105 to have extra time to process the feedback indication before scheduling subsequent communications for the UE 110 in slot 2 720.

For example, at 1080, the method 1000 optionally includes transmitting a reference signal after the two or more symbols in the next slot based on determining that the indication is received in the last ULSB symbol. In an aspect, ACK/NACK component 194, e.g., in conjunction with modem 180, communications component 190, processor(s) 1212, memory 1216, transceiver 1202 (as described in FIG. 12), etc., can transmit the reference signal after the two or more symbols in the next slot based on determining that the indication is received in the last ULSB symbol. For example, ACK/NACK component 194 can determine to transmit DMRS in symbol for DMRS 726 after symbols for PDCCHs 722, 724 in the next slot (e.g., slot 2 720) based on determining that the indication is received in the last ULSB symbol of slot 1 710. This can allow the base station 105 to have extra time to process the feedback indication before scheduling subsequent communications for the UE 110 in slot 2 720.

Figure 11:
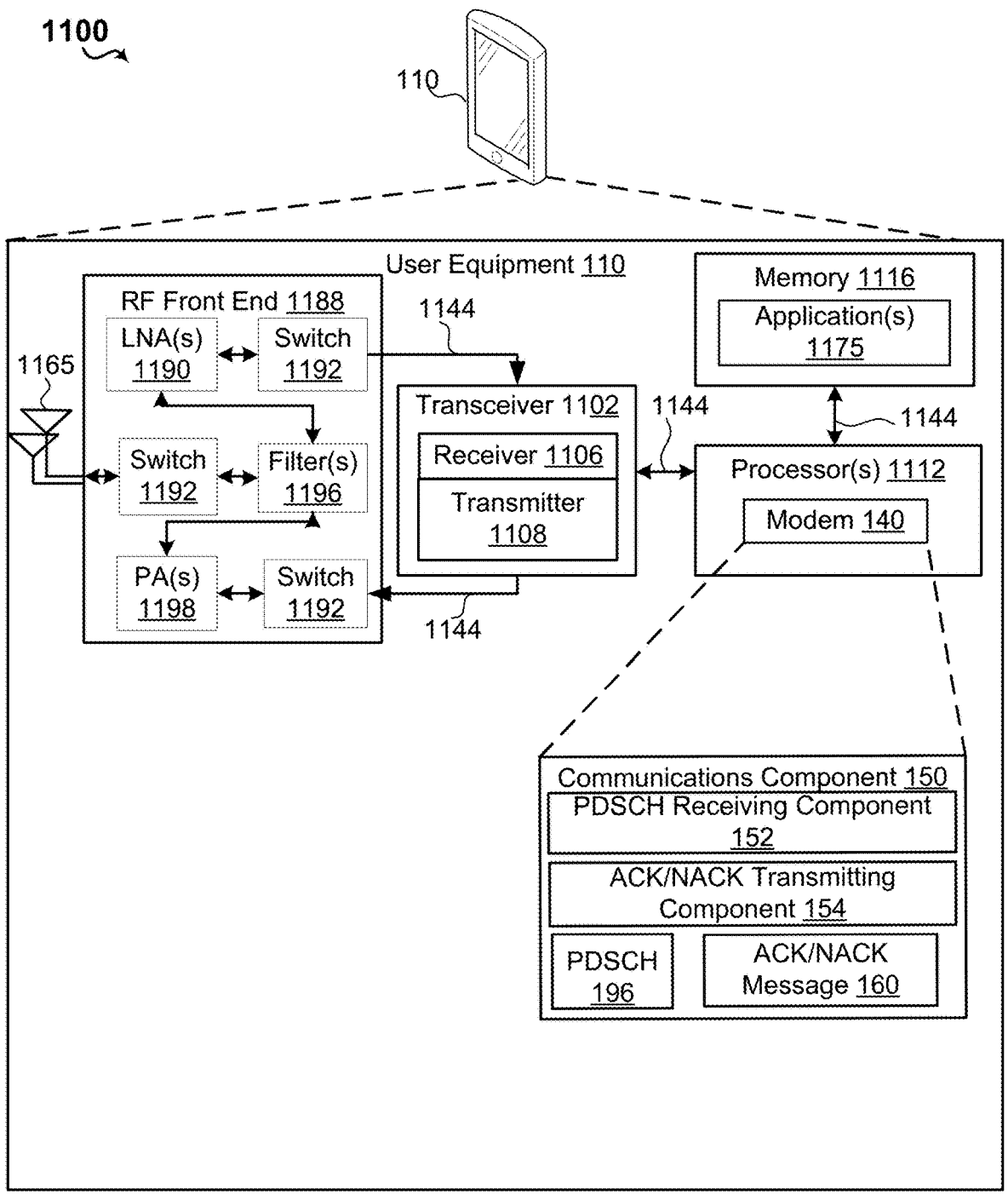
FIG. 11 is a schematic diagram of an example of components of the UE of FIG. 1.

Referring to FIG. 11, one example of an implementation of a UE 110 may include a variety of components, some of which have already been described above, including components such as one or more processors 1112 and memory 1116 and transceiver 1102 in communication via one or more buses 1144, which may operate in conjunction with the modem 140 and communications component 150 to send or transmit the message 160, which may include feedback bits, indications, etc., as described herein, to the base station 105. Further, the one or more processors 1112, modem 140, memory 1116, transceiver 1102, RF front end 1188 and one or more antennas 1165, may be configured to support voice and/or data calls (simultaneously or non-simultaneously) in one or more radio access technologies.

In an aspect, the one or more processors 1112 can include a modem 140 that uses one or more modem processors. The various functions related to communications component 150 may be included in modem 140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with the transceiver 1102. In other aspects, some of the features of the one or more processors 1112 and/or modem 140 associated with the communications component 150 may be performed by the transceiver 1102.

Also, the memory 1116 may be configured to store data used herein and/or local versions of applications 1175 or communications component 150 and/or one or more of its subcomponents being executed by at least one processor 1112. The memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, the memory 1116 may be a non-transitory computer-readable storage medium that stores one or more computer-executable codes defining communications component 150 and/or one or more of its subcomponents, and/or data associated therewith, when the UE 110 is operating at least one processor 1112 to execute the communications component 150 and/or one or more of its subcomponents.

The transceiver 1102 may include at least one receiver 1106 and at least one transmitter 1108. The receiver 1106 may include hardware, firmware, and/or software code executable by a processor for receiving data, the code comprising instructions and being stored in a memory (e.g., computer-readable medium). The receiver 1106 may be, for example, a radio frequency (RF) receiver. In an aspect, the receiver 1106 may receive signals transmitted by at least one base station 105. Additionally, the receiver 1106 may process such received signals, and also may obtain measurements of the signals, such as, but not limited to, Ec/Io, SNR, RSRP, RSSI, etc. The transmitter 1108 may include hardware, firmware, and/or software code executable by a processor for transmitting data, the code comprising instructions and being stored in a memory (e.g., computer-readable medium). A suitable example of the transmitter 1108 may include, but is not limited to, a RF transmitter.

Moreover, in an aspect, the UE 110 may include a RF front end 1188, which may operate in communication with one or more antennas 1165 and transceiver 1102 for receiving and transmitting radio transmissions, for example, wireless communications transmitted by at least one base station 105 or wireless transmissions transmitted by the UE 110. The RF front end 1188 may be communicatively coupled with one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, the LNA 1190 can amplify a received signal at a desired output level. In an aspect, each LNA 1190 may have a specified minimum and maximum gain values. In an aspect, the RF front end 1188 may use one or more switches 1192 to select a particular LNA 1190 and its specified gain value based on a desired gain value for a particular application.

Further, for example, one or more PA(s) 1198 may be used by the RF front end 1188 to amplify a signal for an RF output at a desired output power level. In an aspect, each PA 1198 may have specified minimum and maximum gain values. In an aspect, the RF front end 1188 may use one or more switches 1192 to select a particular PA 1198 and its specified gain value based on a desired gain value for a particular application.

Also, for example, one or more filters 1196 can be used by the RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, the RF front end 1188 can use one or more switches 1192 to select a transmit or receive path using a specified filter 1196, LNA 1190, and/or PA 1198, based on a configuration as specified by the transceiver 1102 and/or processor 1112.

As such, the transceiver 1102 may be configured to transmit and receive wireless signals through one or more antennas 1165 via RF front end 1188. In an aspect, the transceiver 1102 may be tuned to operate at specified frequencies such that the UE 110 can communicate with, for example, one or more cells associated with one or more base stations 105. In an aspect, for example, the modem 140 can configure the transceiver 1102 to operate at a specified frequency and power level based on the configuration of the UE 110 and communication protocol used by the modem 140.

In an aspect, the modem 140 can be a multiband-multimode modem, which can process digital data and communicate with the transceiver 1102 such that the digital data is sent and received using the transceiver 1102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on base station information associated with the UE 110 as provided by the network during cell selection and/or cell reselection.

Figure 12:
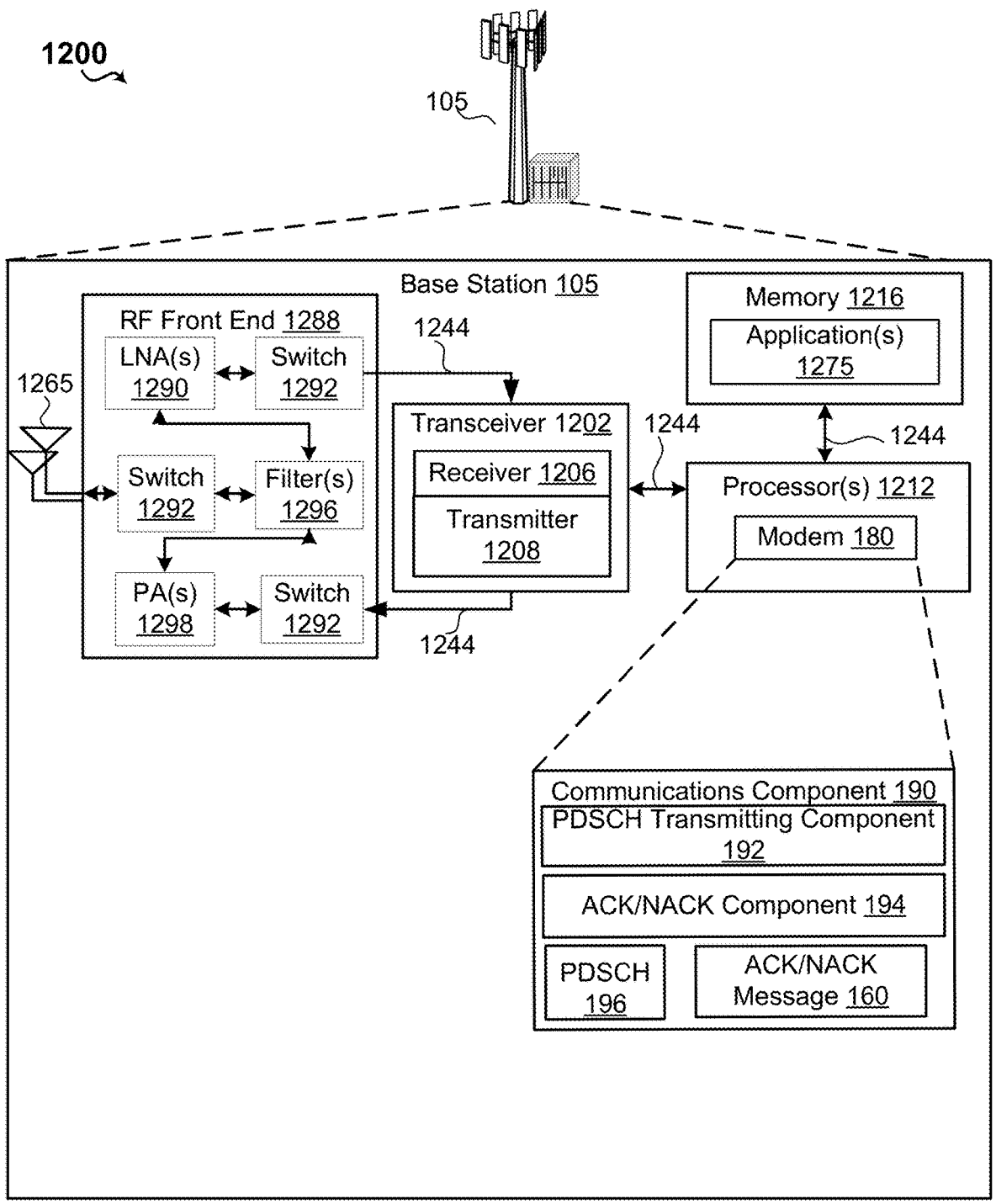
FIG. 12 is a schematic diagram of an example of components of the base station of FIG. 1.

Referring to FIG. 12, one example of an implementation of a base station 105 may include a variety of components, some of which have already been described above, including components such as one or more processors 1212 and memory 1216 and transceiver 1202 in communication via one or more buses 1244, which may operate in conjunction with the modem 180 and communications component 190 to receive feedback from one or more UEs 110 and schedule downlink communications to the UEs 110, as described herein. Further, the one or more processors 1212, modem 180, memory 1216, transceiver 1202, RF front end 1288 and one or more antennas 1265, may be configured to support voice and/or data calls (simultaneously or non-simultaneously) from a UE 110 in one or more radio access technologies.

In an aspect, the one or more processors 1212 can include a modem 180 that uses one or more modem processors. The various functions related to communications component 190 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with the transceiver 1202. In other aspects, some of the features of the one or more processors 1212 and/or modem 180 associated with the communications component 190 may be performed by the transceiver 1202.

Also, the memory 1216 may be configured to store data used herein and/or local versions of applications 1275 or communications component 190 and/or one or more of its subcomponents being executed by at least one processor 1212. The memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, the memory 1216 may be a non-transitory computer-readable storage medium that stores one or more computer-executable codes defining communications component 190 and/or one or more of its subcomponents, and/or data associated therewith, when the base station 105 is operating at least one processor 1212 to execute the communications component 190 and/or one or more of its subcomponents.

The transceiver 1202 may include at least one receiver 1206 and at least one transmitter 1208. The receiver 1206 may include hardware, firmware, and/or software code executable by a processor for receiving data, the code comprising instructions and being stored in a memory (e.g., computer-readable medium). The receiver 1206 may be, for example, a radio frequency (RF) receiver. In an aspect, the receiver 1206 may receive signals transmitted by at least one UE 110. Additionally, the receiver 1206 may process such received signals, and also may obtain measurements of the signals, such as, but not limited to, Ec/Io, SNR, RSRP, RSSI, etc. The transmitter 1208 may include hardware, firmware, and/or software code executable by a processor for transmitting data, the code comprising instructions and being stored in a memory (e.g., computer-readable medium). A suitable example of the transmitter 1208 may include, but is not limited to, a RF transmitter.

Moreover, in an aspect, the base station 105 may include a RF front end 1288, which may operate in communication with one or more antennas 1265 and transceiver 1202 for receiving and transmitting radio transmissions, for example, wireless communications transmitted by at least one UE 110 or wireless transmissions transmitted to the UE 110. The RF front end 1288 may be communicatively coupled with one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, the LNA 1290 can amplify a received signal at a desired output level. In an aspect, each LNA 1290 may have a specified minimum and maximum gain values. In an aspect, the RF front end 1288 may use one or more switches 1292 to select a particular LNA 1290 and its specified gain value based on a desired gain value for a particular application.

Further, for example, one or more PA(s) 1298 may be used by the RF front end 1288 to amplify a signal for an RF output at a desired output power level. In an aspect, each PA 1298 may have specified minimum and maximum gain values. In an aspect, the RF front end 1288 may use one or more switches 1292 to select a particular PA 1298 and its specified gain value based on a desired gain value for a particular application.

Also, for example, one or more filters 1296 can be used by the RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, the RF front end 1288 can use one or more switches 1292 to select a transmit or receive path using a specified filter 1296, LNA 1290, and/or PA 1298, based on a configuration as specified by the transceiver 1202 and/or processor 1212.

As such, the transceiver 1202 may be configured to transmit and receive wireless signals through one or more antennas 1265 via RF front end 1288. In an aspect, the transceiver 1202 may be tuned to operate at specified frequencies such that the base station 105 can communicate with, for example, one or more UEs 110. In an aspect, for example, the modem 180 can configure the transceiver 1202 to operate at a specified frequency and power level based on the configuration of the base station 105 and communication protocol used by the modem 180.

In an aspect, the modem 180 can be a multiband-multi-mode modem, which can process digital data and communicate with the transceiver 1202 such that the digital data is sent and received using the transceiver 1202. In an aspect, the modem 180 can be multiband and be configured to support multiple frequency bands for a specific communications protocol. In an aspect, the modem 180 can be multimode and be configured to support multiple operating networks and communications protocols. In an aspect, the modem 180 can control one or more components of the base station 105 (e.g., RF front end 1288, transceiver 1202) to enable transmission and/or reception of signals from the network based on a specified modem configuration. In an aspect, the modem configuration can be based on the mode of the modem and the frequency band in use.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for communicating feedback in wireless communications, comprising:
    receiving, at a user equipment (UE) and in a downlink portion of a slot, data communications from a base station, wherein the data communications comprise multiple code blocks received in downlink symbols;
    generating, by the UE, feedback bits to provide feedback for the multiple code blocks, wherein a first portion of the feedback bits corresponds to at least a first downlink symbol of the one or more symbols that does not include a last downlink symbol of the downlink portion of the slot, and wherein a second portion of the feedback bits corresponds at least a second downlink symbol of the downlink symbols that includes the last downlink symbol; and
    transmitting, from the UE to the base station and in an uplink portion of the slot, an indication of the feedback bits.

2. The method of claim 1, wherein the uplink portion of the slot comprises an uplink short burst transmitted over one or more uplink symbols, and wherein the one or more uplink symbols are orthogonal frequency division multiplexing (OFDM) symbols.

3. The method of claim 1, further comprising multiplexing a portion of the feedback bits as the indication of the feedback bits by using a repetition feedback bit.

4. The method of claim 1, further comprising encoding a portion of the feedback bits as the indication of the feedback bits by using a Polar code or a Reed-Muller code.

5. The method of claim 1, wherein each of the one or more downlink symbols includes only full code blocks corresponding to portions of the multiple code blocks.

6. The method of claim 5, wherein the indication of the feedback bits comprise one bit for each of the downlink symbols to indicate the feedback for the multiple code blocks in the downlink symbols.

7. The method of claim 1, wherein the downlink portion of the slot includes a partial code block that spans multiple slots.

8. An apparatus for wireless communication, comprising:
    a transceiver;
    a memory configured to store instructions; and
    one or more processors communicatively coupled with the transceiver and the memory, wherein the one or more processors are configured to:
        receive, in a downlink portion of a slot, data communications from a base station, wherein the data communications comprise multiple code blocks received in downlink symbols;
        generate feedback bits to provide feedback for the multiple code blocks, wherein a first portion of the feedback bits corresponds to at least a first downlink symbol of the one or more symbols that does not include a last downlink symbol of the downlink portion of the slot, and wherein a second portion of the feedback bits corresponds at least a second downlink symbol of the downlink symbols that includes the last downlink symbol; and
    transmit, to the base station and in an uplink portion of the slot, an indication of the feedback bits.

9. The apparatus of claim 8, wherein the uplink portion of the slot comprises an uplink short burst transmitted over one or more uplink symbols, and wherein the one or more uplink symbols are orthogonal frequency division multiplexing (OFDM) symbols.

10. The apparatus of claim 8, wherein the one or more processors are further configured to multiplex a portion of the feedback bits as the indication of the feedback bits by using a repetition feedback bit.

11. The apparatus of claim 8, wherein the one or more processors are configured to encode a portion of the feedback bits as the indication of the feedback bits by using a Polar code or a Reed-Muller code.

12. The apparatus of claim 8, wherein each of the downlink symbols includes only full code blocks corresponding to portions of the multiple code blocks.

13. The apparatus of claim 12, wherein the indication of the feedback bits comprise one bit for each of the downlink symbols to indicate the feedback for the multiple code blocks in the downlink symbols.

14. The apparatus of claim 8, wherein the downlink portion of the slot includes a partial code block that spans multiple slots.

15. An apparatus for use at a user equipment (UE), the apparatus comprising:
    means for receiving, in a downlink portion of a slot, data communications from a base station, wherein the data communications comprise multiple code blocks received in downlink symbols;
    means for generating feedback bits to provide feedback for the multiple code blocks, wherein a first portion of the feedback bits corresponds to at least a first downlink symbol of the one or more symbols that does not include a last downlink symbol of the downlink portion of the slot, and wherein a second portion of the feedback bits corresponds at least a second downlink symbol of the downlink symbols that includes the last downlink symbol; and means for transmitting, to the base station and in an uplink portion of the slot, an indication of the feedback bits.

16. The apparatus of claim 15, wherein the uplink portion of the slot comprises an uplink short burst transmitted over one or more uplink symbols, and wherein the one or more uplink symbols are orthogonal frequency division multiplexing (OFDM) symbols.

17. The apparatus of claim 15, further comprising multiplexing a portion of the feedback bits as the indication of the feedback bits by using a repetition feedback bit.

18. The apparatus of claim 15, further comprising encoding a portion of the feedback bits as the indication of the feedback bits by using a Polar code or a Reed-Muller code.

19. The apparatus of claim 15, wherein each of the downlink symbols includes only full code blocks corresponding to portions of the multiple code blocks.

20. The apparatus of claim 19, wherein the indication of the feedback bits comprise one bit for each of the downlink symbols to indicate the feedback for the multiple code blocks in the downlink symbols.

21. The apparatus of claim 15, wherein the downlink portion of the slot includes a partial code block that spans multiple slots.

22. An article of manufacture comprising:

a non-transitory computer readable medium having stored therein instructions executable by one or more processors of a user equipment (UE) to:

receive, via a transceiver of the UE and in a downlink portion of a slot, data communications from a base station, wherein the data communications comprise multiple code blocks received in downlink symbols;

generate feedback bits to provide feedback for the multiple code blocks, wherein a first portion of the feedback bits corresponds to at least a first downlink symbol of the one or more symbols that does not include a last downlink symbol of the downlink portion of the slot, and wherein a second portion of the feedback bits corresponds at least a second downlink symbol of the downlink symbols that includes the last downlink symbol; and transmit, via the transceiver to the base station and in an uplink portion of the slot, an indication of the feedback bits.

* * * * *